United States Patent [19]

Johnson et al.

[11] 4,361,869

[45] Nov. 30, 1982

[54] MULTIMODE MEMORY SYSTEM USING A MULTIWORD COMMON BUS FOR DOUBLE WORD AND SINGLE WORD TRANSFER

[75] Inventors: Robert B. Johnson, Billerica; Chester M. Nibby, Jr., Peabody, both of Mass.

[73] Assignee: Honeywell Information Systems Inc., Waltham, Mass.

[21] Appl. No.: 110,520

[22] Filed: Jan. 8, 1980

[51] Int. Cl.³ .................................................. G06F 13/00
[52] U.S. Cl. .................................................. 364/200
[58] Field of Search ... 364/200 MS File, 900 MS File

[56] References Cited

U.S. PATENT DOCUMENTS 4,099,231 7/1978 Kotok et al. ..................... 364/200
4,236,203 11/1980 Curley et al. ..................... 364/200

*Primary Examiner*—Raulfe B. Zache
*Attorney, Agent, or Firm*—Faith F. Driscoll; Nicholas Prasinos

[57] ABSTRACT

A memory subsystem couples to a double wide word bus in common with a number of central processing units for processing memory requests received therefrom. The subsystem includes at least a pair of independently addressable dynamic memory module units. Each memory unit includes a number of rows of random access memory (RAM) chips. The subsystem further includes common control circuits, timing circuits and common addressing circuits. The addressing circuits which couple to both module units provide the required address signals to both modules for enabling the simultaneous access of a pair of words therefrom into a pair of data registers. The outputs of the data registers couple to the inputs of a pair of output multiplexer circuits. The outputs of the multiplexer circuits are connected to provide double wide output to the double wide word bus. The timing circuits generate a sequence of timing signals for access and read out of the pair of words into the data registers for simultaneous transfer via the multiplexer circuits to the double wide bus. The control circuits which in response to each memory request specifying a double fetch operation, condition the multiplexer circuits and memory subsystem for operation in a degraded mode. When in this mode, the pair of words read out to the data registers are multiplexed onto a portion of the bus for transfer to the requesting central processing unit over a corresponding number of successive bus cycles thereby making the memory subsystem compatible with central processing units having a double fetch capability.

31 Claims, 11 Drawing Figures

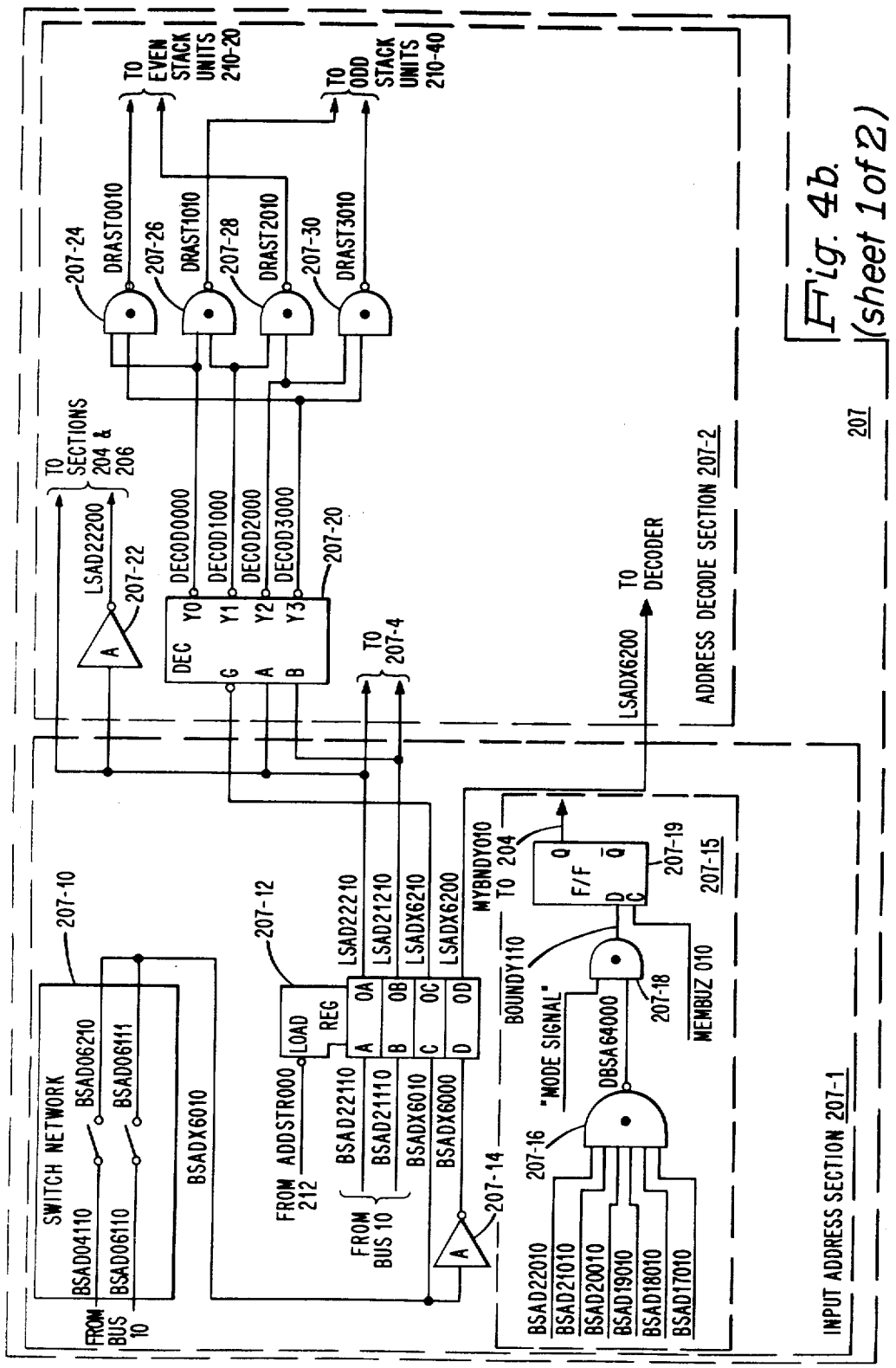
Fig. 4b. (sheet 1 of 2)

MULTIMODE MEMORY SYSTEM USING A MULTIWORD COMMON BUS FOR DOUBLE WORD AND SINGLE WORD TRANSFER

RELATED APPLICATIONS

1. "Sequential Chip Select Decode Apparatus and Method" invented by Robert B. Johnson, Chester M. Nibby, Jr. and Dana W. Moore, Ser. No. 110,523, filed on Jan. 8, 1980 and assigned to the same assignee as named herein.
2. "Sequential Word Aligned Address Apparatus" invented by Robert B. Johnson, Chester M. Nibby, Jr. and Dana W. Moore, Ser. No. 110,521, filed on Jan. 8, 1980 and assigned to the same assignee as named herein.
3. "Low Cost Double Word Fetch System" invented by Robert B. Johnson, Chester M. Nibby, Jr. and Dana W. Moore, Ser. No. 110,522, filed on Jan. 8, 1980 and assigned to the same assignee as named herein.

BACKGROUND OF THE INVENTION

1. Field of Use

This invention relates to memory systems containing semiconductor memory elements including those in which stored information must be periodically refreshed to preserve the integrity of such information.

2. Prior Art

It is well known to construct memory systems from a number of memory modules. In certain prior art systems, memory modules are paired together to provide a double word fetch access capability. The term double word fetch access as used herein refers to the capability of being able to access a pair of words at a time from a memory system during a cycle of operation. This type of system is described in the copending patent application "System Providing Multiple Fetch Bus Cycle Operation", invented by John L. Curley, Robert B. Johnson, Richard A. Lemay and Chester M. Nibby, Jr., Ser. No. 867,270, filed on Jan. 5, 1978, now U.S. Pat. No. 4,236,203 issued on Nov. 25, 1980, and assigned to the same assignee as named herein.

In the above prior art system, the memory system connects to an asynchronously operated single word wide bus. In the arrangement, a request for multiple words is made in a single bus cycle and the requested information words are delivered to the bus over a cycle of operation which consists of a series of response cycles.

It has been found that in order to maximize transfers, it is desirable to be able to transfer a pair of words over a double wide bus during a single bus cycle. To achieve this mode of operation, it is necessary to provide a memory system which is able to access both module units simultaneously. Such an arrangement is described in the cited related copending patent application "Sequential Chip Select Decode Apparatus and Method".

For compatibility purposes, it is desired that the double wide bus system perform double fetch operations. This necessitates that two types of memory systems be connected into the system. Accordingly, such systems have the disadvantage of increased complexity high cost and increased maintenance.

Accordingly, it is a primary object of the present invention to provide a memory subsystem which is compatible with systems which incorporate a double fetch capability.

It is a further object of the present invention to provide a memory subsystem capable of operating in more than one mode and which can be implemented within a minimum of circuits.

SUMMARY OF THE INVENTION

The above and other objects are achieved in a preferred embodiment of the preferred embodiment of the memory subsystem of the present invention which couples to a double word bus in common with a central processing unit and processes memory requests received therefrom. The subsystem includes at least a pair of independently addressable memory module units which operatively couple to a single word bus. Each memory module unit includes a number of rows of random access memory (RAM) chips.

In the system of the present invention, the address associated with each memory request received by the memory subsystem is coded so that the least significant or low order memory address bits specify which row of RAM chips contains the first word to be accessed. The remaining more significant or higher order memory address bits specify the storage location within one of the module units containing the word to be accessed.

The memory subsystem further includes common timing circuits, common addressing circuits and common control circuits. The addressing circuits which couple to both module units provide the required address signals to both modules within a minimum of time for enabling simultaneous access of a pair of words for read out into a pair of data registers. The outputs of the data registers couple to the inputs of a pair of output multiplexer circuits. The outputs of the multiplexer circuits are connected to provide a double wide output to the double wide word bus.

The timing circuits generate a sequence of timing signals for access and read out of the pair of words into the data registers and simultaneous transfer via the multiplexer circuits to the double wide bus. The control circuits in response to each memory request specifying a double fetch operation, condition the multiplexer circuits and memory subsystem to operate in a degraded mode.

When in this mode, the pair of words read out to the data registers are multiplexed onto a single word portion of the bus. Thereafter, the words are transferred to the requesting central processing unit over a corresponding number of successive bus cycles. Thus, the memory subsystem is compatible with central processing units which have the capability of generating memory requests specifying double fetch operations.

The above arrangement eliminates the need for providing different memory subsystems with systems that are required to process transfers on double wide and double fetch modes of operation.

The subsystem of the present invention utilizes or incorporates the Sequential Chip Select Decode Apparatus and the Sequential Word Aligned Address Apparatus which are described in detail in the referenced related patent applications. This reduces considerably the complexity of the addressing and decode circuits. The result is that the multimode memory subsystem of the present invention can be constructed at low cost and with a minimum of circuit complexity. This facilitates maintenance and increases reliability.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

GENERAL DESCRIPTION OF SYSTEM OF FIG. 1

Figure 1:
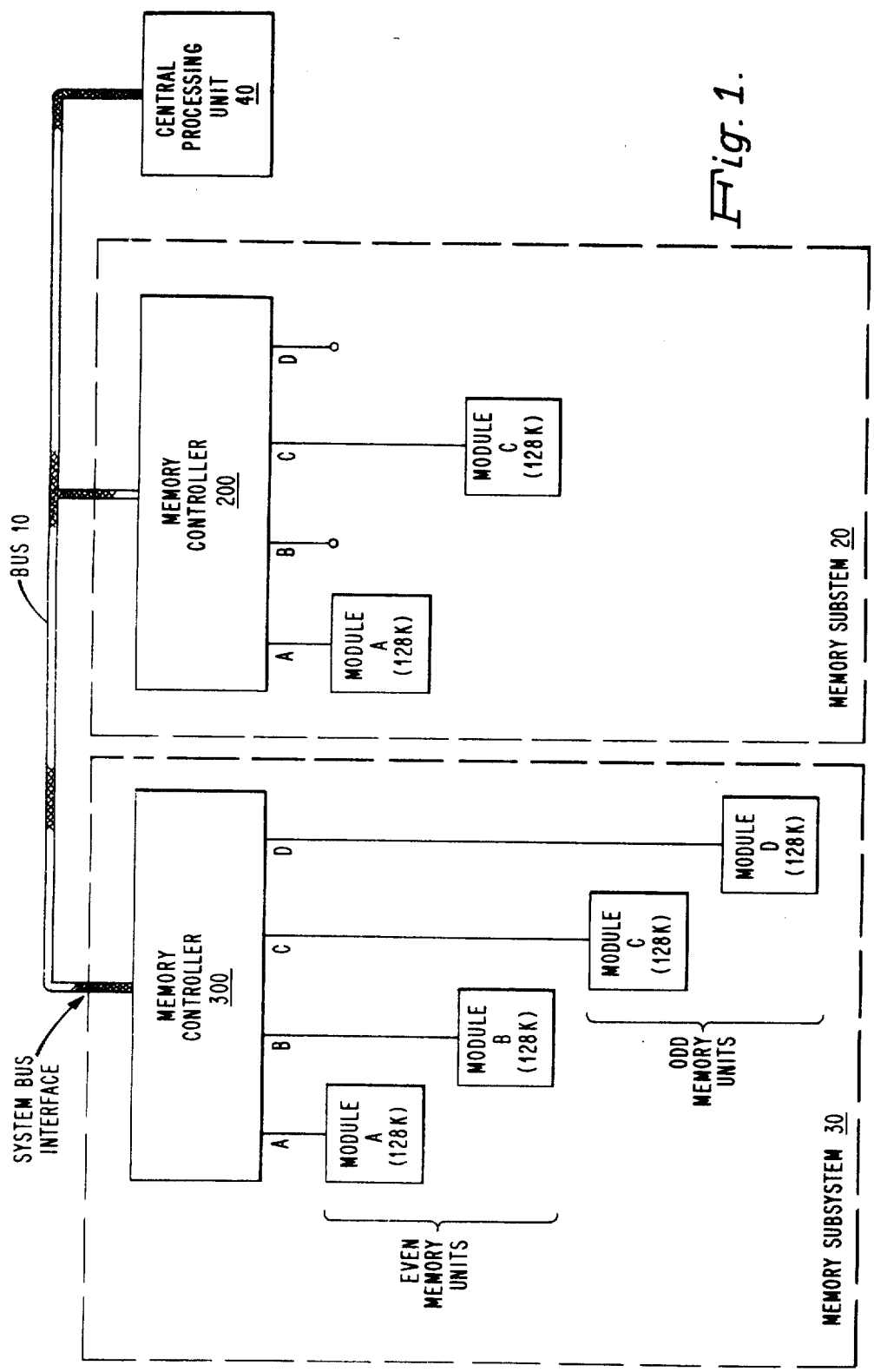
FIG. 1 shows in block diagram form a system which incorporates the principles of the present invention.

FIG. 1 illustrates a data processing system which includes the apparatus of the present invention. Referring to the figure, it is seen that the system includes a multiline bus 10 coupled to a plurality of memory subsystems 20 and 30 and to a central processing unit (CPU) 40. It will be appreciated that the system of FIG. 1 will normally include other units such as those disclosed in U.S. Pat. No. 4,000,485, issued Dec. 28, 1976. The memory subsystems 20 and 30 each include a memory controller which can address up to four memory module units. In FIG. 1, memory controller 200 is connected to address module units labeled A and C while memory controller 300 is connected to address the module units labeled A through D.

The CPU 40 is operated under control of a microprogrammable control unit which includes a control store, an output register and decode and control circuits, not shown. Different groups of words of the control store correspond to groups of microinstructions coded for executing program instructions. Each microinstruction word has a format similar to that disclosed in U.S. Pat. No. 4,130,879, issued Dec. 19, 1978 to David A. Cushing titled "Apparatus for Performing Floating Point Arithmetic Operations Using Submultiple Storage".

The particular word format includes a bus control field. These bits are coded to generate signals for specifying the particular type of operation required for the execution of the different program instructions being processed by CPU 40. Additionally, as explained herein, the bits generate signals for applying the appropriate address to bus 10. For example, those program instructions specifying operations including fetching instructions or procedure words from memory each cause the accessing and read out of a microinstruction word from the control store in which the bus control field bits are coded to specify a single word fetch memory read operation. Other program instructions such as those specifying the fetching of operands or data from memory each cause the read out of a microinstruction word from the control store in which the bus control field bits are coded to specify a double word fetch memory read operation. Other modes of operation may also be specified im a similar manner.

The CPU 40 and memory subsystems 20 and 30 communicate over the bus 10 in a predetermined manner as generally set forth in U.S. Pat. No. 4,000,485. Briefly, a unit wishing to communicate requests a bus cycle and when the bus cycle is granted, the unit becomes the "master" and is able to address any other unit in the system as the "slave". In cases of those bus exchanges which require a response (e.g. memory read operation), the requesting unit as "master" identifies itself and indicates to the "slave" unit that a response is required. When the slave is ready to respond (e.g. obtains the information requested), it assumes the role of "master" and initiates the transfer of information to the requesting unit. Thus, the number of bus cycles vary depending upon the type of operation being performed. By altering the states of the signals applied to the control lines discussed in connection with FIG. 2, a unit is able to designate to the other unit, the type of cycle or operation being initiated or performed.

MEMORY SUBSYSTEM INTERFACE

Figure 2:
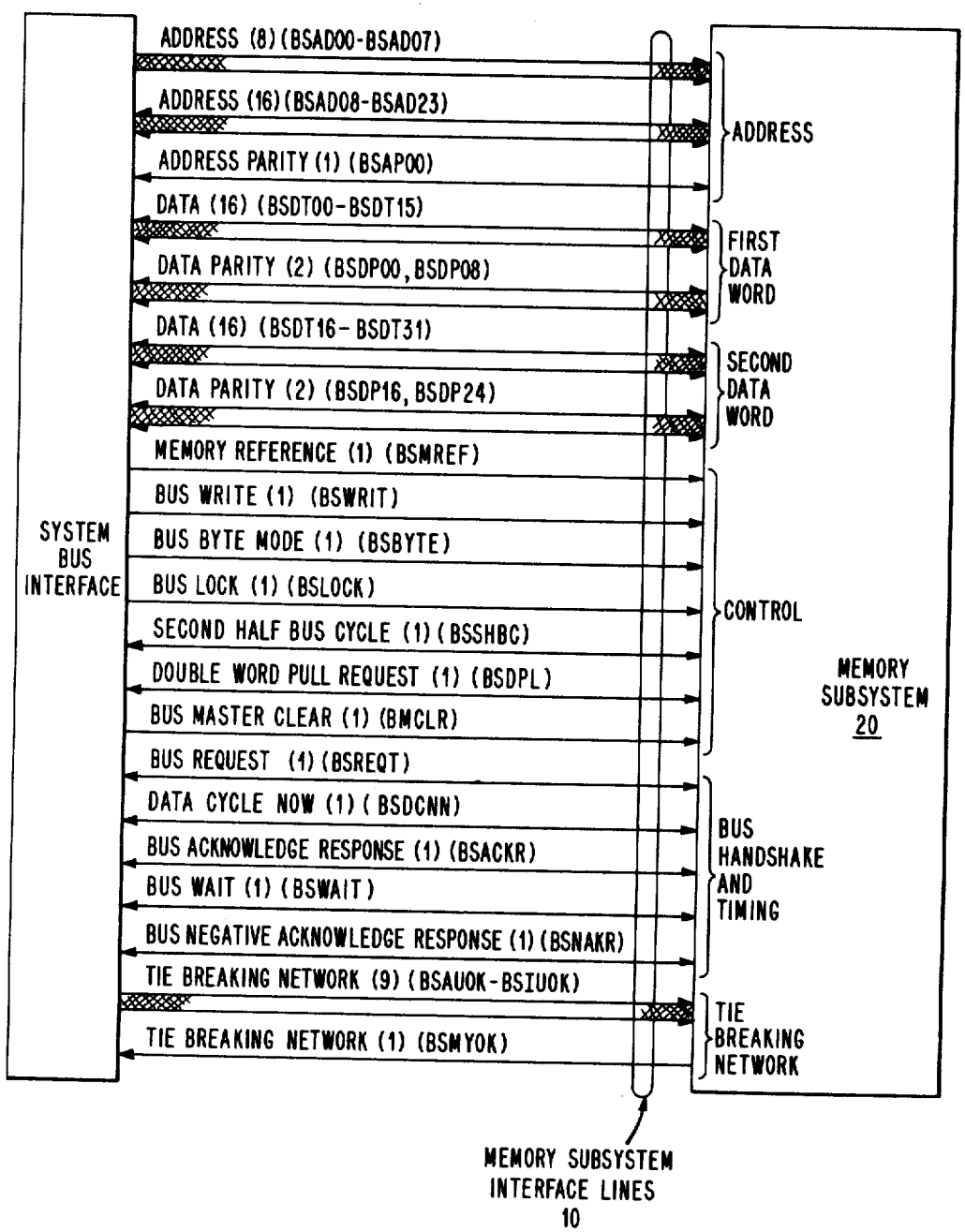
FIG. 2 shows in detail the lines of the system bus 10 which connect to the memory subsystem of FIG. 1.

FIG. 2 shows the lines which constitute the interface between each memory subsystem and bus 10. As shown, bus 10 includes a number of address lines (BSAD00-23, BSAP00), two sets of data lines (BSDT00-15, BSDP00, BSDP08) and (BSDT16-BSDT31, BSDP16, BSDP24), a number of control lines (BSMREF-BSMCLR), a number of timing lines (BSREQT-BSNAKR) and a number of tie breaking network lines (BSAUOK-BSIUOK, BSMYOK).

The description of the above interface lines are given in greater detail in the section to follow.

| MEMORY SUBSYSTEM INTERFACE LINES | |
|---|---|
| Designation | Description |
| | Address Lines |
| BSAD00-BSAD23 | The bus address lines constitute a twenty-four bit wide path used in conjunction with the bus memory reference line BSMREF to transfer a 24-bit address to subsystem 20 or a 16-bit identifier from subsystem 20 to bus 10 (for receipt by a slave unit). When used for memory addressing, the signals applied to lines BSAD00-BSAD03 select a particular 512K word module, the signals applied to lines BSAD04-BSAD22 select one of the 512K words in the module while the signal applied to line BSAD23 selects one of the bytes within the selected word (i.e., BSAD23=1= right byte; BSAD23=0=left byte). When used for identification, lines BSAD00-BSAD07 are not used. The lines BSAD08-BSAD23 carry the identification of the receiving unit as transmitted to subsystem 20 during the previous memory read request. |
| BSAP00 | The bus address parity line is a bidirectional line which provides an odd parity signal for the address signals applied to lines BSAD00-BSAD07. |
| | Data Lines |
| BSDT00-BSDT15, BSDT16-BSDT31 | The sets of bus data lines constitute a 32-bit or two word wide bidirectional path for transferring data or identification information between subsystem 20 and bus 10 as a function of the cycle of operation being performed. |

MEMORY SUBSYSTEM INTERFACE LINES

| Designation | Description |
|---|---|
| | During a write cycle of operation, the bus data lines transfer information to be written into memory at the location specified by the address signals applied to lines BSAD00–BSAD23. During the first half of a read cycle of operation, the data lines transfer identification information (channel number) to the subsystem 20. During the second half of the read cycle, the data lines transfer the information read from memory. |
| BSDP00, BSDP08, BSDP16, BSDP24 | The bus data parity lines are two sets of bidirectional lines which provide odd parity signals coded as follows: BSDP00=odd parity for signals applied to lines BSDT00–BSDT07 (left byte); BSDP08=odd parity for signals applied to lines BSDT08–BSDT15 (right byte); BSDP16=odd parity for signals applied to lines BSDT16–BSDT23; and BSDP24=odd parity signals applied to lines BSDT24–BSDT31. |

Control Lines

| Designation | Description |
|---|---|
| BSMREF | The bus memory reference line extends from bus 10 to the memory subsystem 20. When set to a true state, this line signals the subsystem 20 that the lines BSAD00–BSAD23 contain a complete memory controller address and that it is performing a write or read operation upon the specified location. When reset to a false state, the line signals subsystem 20 that the lines BSAD00–BSAD23 contain information directed to another unit and not subsystem 20. |
| BSWRIT | The bus write line extends from the bus 10 to the memory subsystem 20. This line when set to a true state, in conjunction with line BSMREF being true, signals subsystem 20 to perform a write cycle of operation. When reset to a false state, this line, in conjunction with line BSMREF being true, signals subsystem 20 to perform a read cycle of operation. |
| BSBYTE | The bus byte line extends from bus 10 to subsystem 20. This line, when set to a true state, signals subsystem 20 that it is to perform a byte operation rather than a word operation. |
| BSLOCK | The bus lock line extends from bus 10 to subsystem 20. When set to a true state, this line signals subsystem 20 of a request from central processor 40 to test or change the status of a memory lock flip-flop included within the controller 200. |
| BSSHBC | The bus second half bus cycle line is used to signal a unit that the current information applied to bus 10 by subsystem 20 is the information requested by a previous read request. In this case, both subsystem 20 and the unit receiving the information are busy to all units from the start of the initiation cycle until subsystem 20 completes the transfer. This line is used in conjunction with the BSLOCK line to set or reset its memory lock flip-flop. When a unit is requesting to read or write and line BSLOCK is true, the line BSSHBC, when true, signals subsystem 20 to reset its lock flip-flop. When in a false state, it signals subsystem 20 to test and set its lock flip-flop. |
| BSDBPL | The double word pull line is a bidirectional line which extends between bus 10 and subsystem 20. This line, when set to a true state, signals subsystem 20 that a double word operation is requested. Additionally, the subsystem 20 forces the line to a true state during the data cycle (BSDCNN=1) to signal the receiving unit that a second word is to follow. When the second word falls on an address boundary condition, the line is not forced to a true state and only a single word is transferred. When the BSDBPL line is set to a false state, this signals subsystem 20 that a double wide word is requested. |
| BSMCLR | The bus master clear line extends from bus 10 to subsystem 20. When this line is set to a true state, it causes the subsystem 20 to clear to zeros certain bus circuits within controller 200. |

Bus Handshake/Timing Lines

| Designation | Description |
|---|---|
| BSREQT | The bus request line is a bidirectional line which extends between bus 10 and subsystem 20. When set to a true state, it signals the subsystem 20 that another unit is requesting a bus cycle. When reset to a false state, it signals subsystem 20 that there is no bus pending bus request. This line is forced to a true state by subsystem 20 to request a read second half bus cycle. |
| BSDCNN | The data cycle line is a bidirectional line which extends between bus 10 and subsystem 20. When forced to a true state, the line signals the subsystem 20 that a unit was granted a requested bus cycle and placed information on the bus for another unit. The subsystem 20 forces the line to a true state to signal that it is transmitting requested data back to a unit. Prior to this, subsystem 20 had requested and been granted a bus cycle. |
| BSACKR | The bus acknowledge line is a bidirectional line which extends between the bus 10 and subsystem 20. When set to a binary ONE by subsystem 20, the line signals that it is accepting a bus transfer during a read first half bus cycle or write cycle. During a read second half bus cycle, this line when set to a binary ONE by the unit which originated the request signals the subsystem 20 of its acceptance of a transfer. |
| BSWAIT | The bus wait line is a bidirectional |

-continued

MEMORY SUBSYSTEM INTERFACE LINES

| Designation | Description |
|---|---|
| | line which extends between bus 10 and subsystem 20. When set to a true or binary ONE state by subsystem 20, it signals a requesting unit that the subsystem cannot accept a transfer at this time. Thereafter, the unit will initiate successive retries until the subsystem 20 acknowledges the transfer. The subsystem 20 sets the BSWAIT line true under the following conditions:<br>1. It is busy performing an internal read or write cycle of operation.<br>2. It is requesting a read second half bus cycle.<br>3. It is anticipating a refresh operation.<br>4. It is performing a refresh operation.<br>5. It is busy when placed in an initialize mode.<br>When the BSWAIT line is set to a true or binary ONE state by a unit, this signals the subsystem 20 that the data is not being accepted by the requesting unit and to terminate its present bus cycle of operation. |
| BSNAKR | The bus negative acknowledge line is a bidirectional line which extends between the bus 10 and subsystem 20. When this line is set to a true or binary ONE state by subsystem 20, it signals that it is refusing a specified transfer. The subsystem 20 sets line BSNAKR to a true state as follows:<br>1. Memory lock flip-flop is set to a binary ONE, and<br>2. The request is to test and set the lock flip-flop (BSLOCK true and BSSHBC false).<br>In all other cases, when the memory lock flip-flop is set, subsystem 20 generates a response via the BSACKR line or the BSWAIT line or generates no response.<br>When the BSNAKR line is forced true by a unit, this signals subsystem 20 that the data is not accepted by the unit and to terminate its cycle of operation.<br>Tie Breaking Control Lines |
| BSAUOK-BSIUOK | The tie breaking network lines extend from bus 10 to subsystem 20. These lines signal subsystem 20 whether units of higher priority have made bus requests. When all the signals on these lines are binary ONES, this signals subsystem 20 that it has been granted a bus cycle at which time it is able to force the BSDCNN line to a binary ONE. When any one of the signals on the lines is a binary ZERO, this signals subsystem 20 that it has not been granted a bus cycle and is inhibited from forcing line BSDCNN to a binary ONE. |
| BSMYOK | The tie breaking network line extends from subsystem 20 to bus 10. Subsystem 20 forces this line to a false or binary ZERO state to signal other units of lower priority of a bus request. |

Memory Subsystem 20

Figure 3:
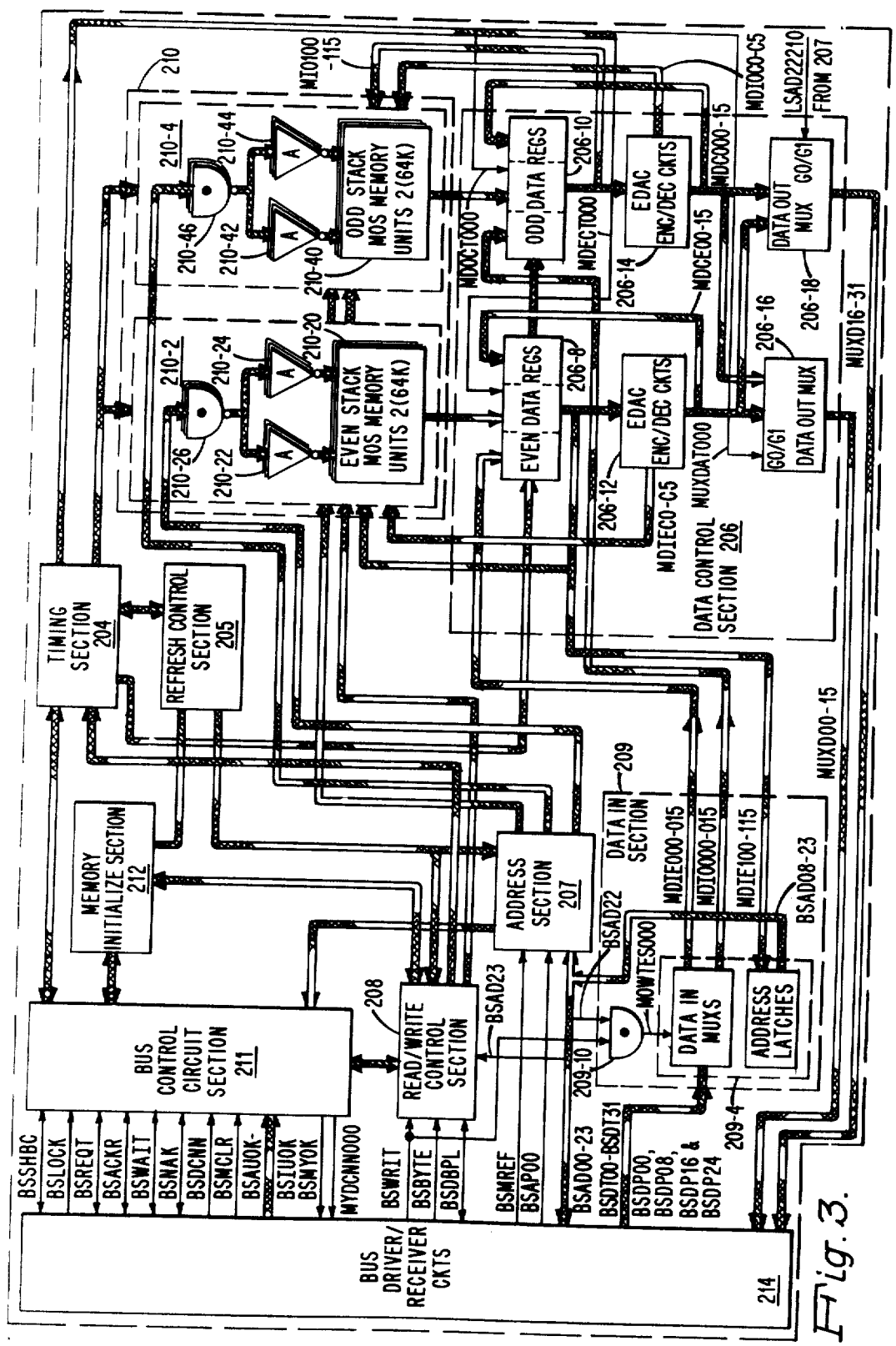
FIG. 3 shows in block diagram form, the memory subsystem 20 of FIG. 1.

FIG. 3 shows a preferred embodiment of a memory subsystem which is constructed using the principles of the present invention. Referring to FIG. 3, it is seen that subsystem 20 includes a memory controller 200 which controls the two 128K word memory module units 210-2 and 210-4 of memory section 210. The module units of blocks 210-2 and 210-4 include high speed MOS random access memory integrated circuits designated by blocks 210-20 and 210-40, and address buffer circuits designated by blocks 210-22 through 210-46. Each 128K memory unit is constructed from 64K word by one bit dynamic MOS RAM chips illustrated in greater detail in FIG. 4c. More specifically, referring to FIG. 4c, it is seen that each 128K by 22 bit memory module includes forty-four 65,534 (64K) word by one bit chips. Within each chip there are a number of storage arrays organized in a matrix of 256 rows by 256 columns of storage cells.

The controller 200 includes those circuits required to generate memory timing signals, perform refresh operations, data transfer operations, address distribution and decoding operations and bus interface operations. Such circuits are included as part of the different sections of FIG. 3.

The sections include a timing section 204, a refresh control section 205, a data control section 206, an address section 207, a read/write control section 208, a data in section 209, a bus control circuit section 211 and memory initialize circuit section 212.

The bus control section 211 includes the logic circuits which generate signals for generating and accepting bus cycle requests for single and double wide word operations. As seen from FIG. 3, these circuits as well as the circuits of other sections are connected to bus 10 via driver and receiver circuits, conventional in design. It will be noted that the binary ONE and ZERO states of the signals on bus 10 and those utilized within subsystem 20 differ. The bus signals operate with negative logic while the subsystem 20 utilizes positive logic. The section 211 includes the tie breaking network circuits which resolves request priority on the basis of a unit's physical position for the bus. The memory subsystem 20, located at the left most or bottom position, is assigned the highest priority while the CPU 40, located at the highest most or top position, is assigned the lowest priority. For further information regarding bus operation, reference may be made to the above mentioned U.S. patents and U.S. patent applications.

Figure 4A:
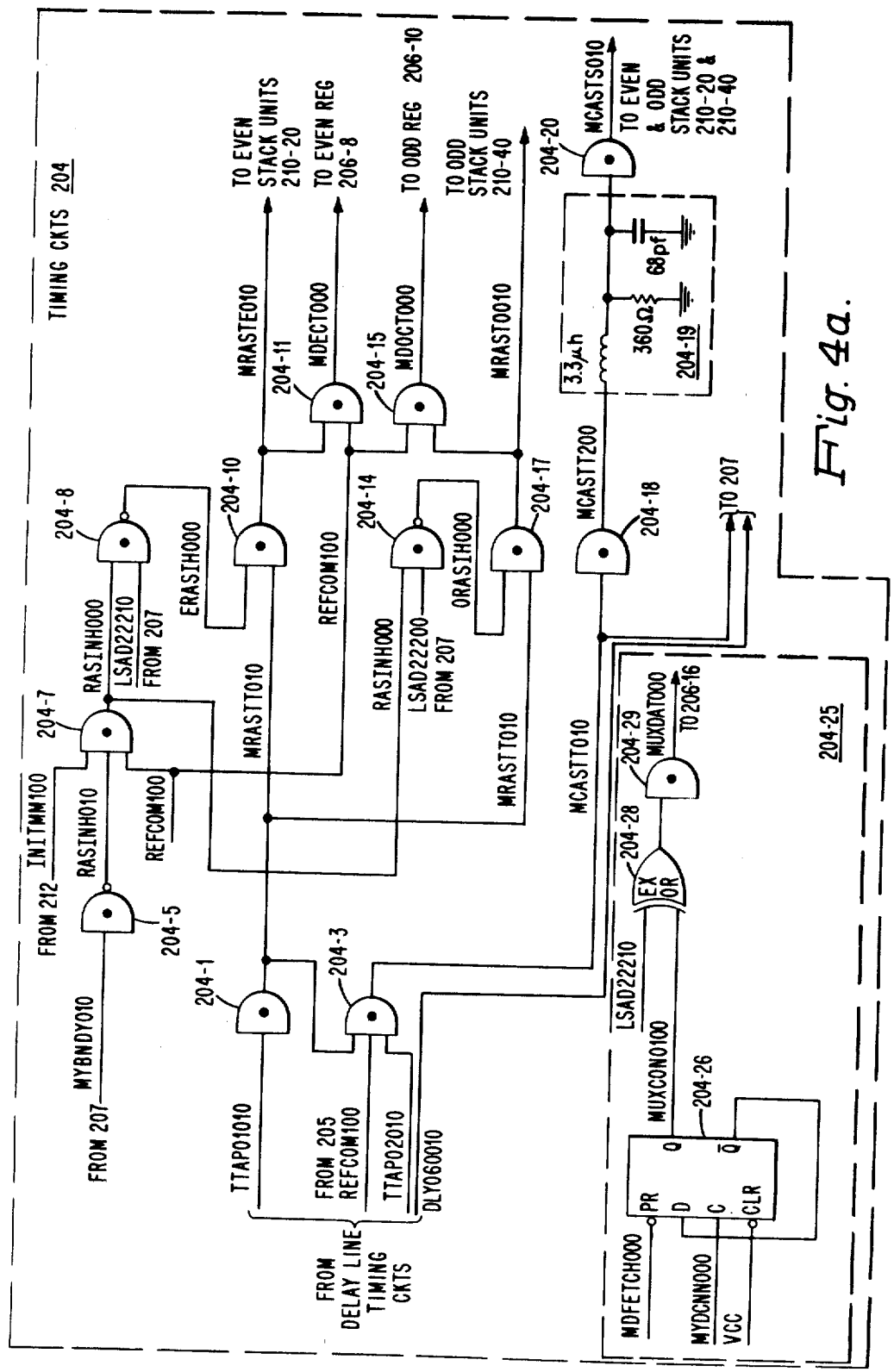
FIGS. 4a through 4e illustrate in greater detail different portions of the memory subsystem 20 of FIG. 3.
Figure 4B:
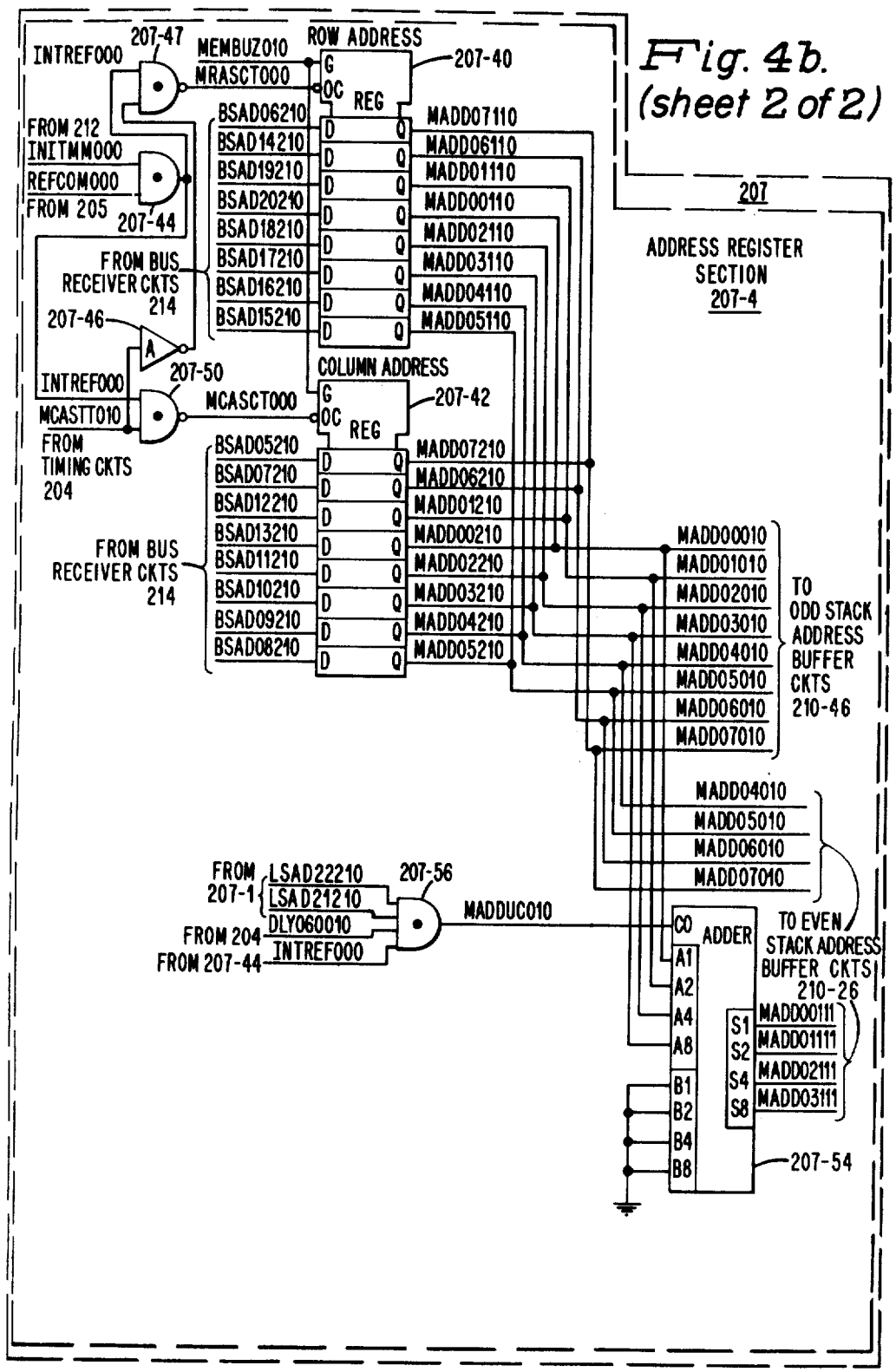

The timing section 204, shown in detail in FIG. 4b, includes circuits which generate the required sequence of timing signals for memory read and write cycles of operation. As seen from FIG. 3, this section transmits and receives signals to and from sections 205, 206, 207, 208 and 211.

In accordance with the present invention, the address section 207, shown in greater detail in FIG. 4b, includes circuits which decode, generate and distribute address signals required for initialization and read/write selection. The section 207 receives address signals from lines BSAD00-BSAD23 and BSAP00 in addition to the memory reference control signal from the BSMREF line. Additionally, section 207 receives control and timing signals from sections 204 and 212.

The memory initialize section 212 includes circuits, conventional in design, for clearing the memory subsystem circuits to an initial or predetermined state.

The read/write control section 208 includes register and control logic circuits, conventional in design. The register circuits receive and store signals corresponding to the states of the BSWRIT, BSBYTE and BSDBPL control lines and the address line BSAD23. The control circuits decode the signals from register circuits and generate signals applied to sections 204, 207 and 210 for establishing whether the subsystem is to perform a read, write or a read followed by a write cycle of operation (i.e., for a byte command).

The refresh section 205 includes the circuits for periodically refreshing the contents of memory. Section 205 receives timing and control signals from section 204 and provides control signals to sections 204, 207, 208 and 212.

The data in section 209 circuits of block 209-4 include a pair of multiplexer circuits and an address register which is connected to receive signals from section 206.

The multiplexer circuits, conventional in design, receive data words from the two sets of bus lines BSDT00-15 and BSDT16-31 and apply the appropriate words via the sets of output lines MDIE000-015 and MDI0000-015 to the correct memory modules during a write cycle of operation. That is, multiplexer circuits are selectively enabled by signal MOWTES000 generated by an AND gate 209-10. The AND gate 209-10 generates signal MOWTES000 as a function of bus address bit 22 (i.e., signal BSAD22) and whether the memory subsystem is doing a write operation (i.e., signal BSWRIT). During a write operation, signal MOWTES000 applies the correct data word (i.e., the word applied to bus lines BSDT00-15 or BSDT16-31) into the correct memory unit. This enables a write operation to start on any word boundary.

During a read operation, the multiplexer circuits are conditioned to apply the module identification information received from the bus lines BSDT00-15 back to the address bus lines BSAD08-23. This is done by loading the signals applied to lines BSDT00-15 into the even data registers 206-8 of section 206. This, in turn, causes the address register latches of block 209-4 to be loaded with the module identification information transmitted via the bus lines BSDT00-15. Since this is not pertinent to an understanding of the present invention, it will not be further discussed herein.

For further information regarding the above arrangement, reference may be made to the related patent application "Sequential Word Aligned Addressing Apparatus".

The data control section 206 includes the registers 206-8 and 206-10 and data out multiplexer circuits 206-16 and 206-18. These circuits enable data to be written into and/or read from the odd and even memory units 210-20 and 210-40 of section 210 under the control of signals from sections 204 and 207. For example, during a read cycle of operation, when the subsystem is operating in a double wide mode, operand or instruction signals are read out simultaneously from the units 210-20 and 210-40 into the even data and odd data registers 206-8 and 206-10. During a write cycle of operation, operand signals are loaded into the even data and odd data registers 206-8 and 206-10 from section 209 and written into the memory units of section 210.

For ease of illustration, the even data and odd data registers 206-8 and 206-10 are shown as a single block. However, it should be understood that these registers actually are made up of three distinct registers represented by the dotted lines in each block. The reason is that multiple registers are required for using the EDAC generation and correction logic circuits during both read and write cycles.

It will be noted that the outputs of these registers connect in common. In order to provide the appropriate transfers of data during read, write and byte write operations, the appropriate register is enabled by the tri-state control. As explained herein, such registers are constructed from D type transparent latch circuits such as those designated as SN74S373 manufactured by Texas Instruments Incorporated. In the case of a read operation, this enables the address ID information received from the bus 10 to be transferred to the address latches of block 209-4. For the purposes of the present invention, it can be assumed that the appropriate data register is enabled during the processing of memory requests.

The section 206 further includes an error detection and correction (EDAC) capability wherein each word contains 16 data bits and 6 check bits used to detect and correct single bit errors in the data words and detect and signal without correction, double bit errors in the data word.

The EDAC capability is provided by the EDAC encoder/decoder circuits 206-12 and 206-14. These circuits, as shown, connect to the even and odd data registers 206-8 and 206-10. During read and write cycles of operation, they perform the required encoding and decoding operations. The encoder/decoder circuits may be considered conventional in design and may for example take the form of those circuits disclosed in U.S. Pat. No. 4,072,853 which issued Feb. 7, 1978.

DETAILED DESCRIPTION OF CONTROLLER SECTIONS

Only those sections which are believed necessary to an understanding of the present invention are described herein. For further information regarding the remaining sections, reference may be made to the related patent applications or to copending patent application "A Dynamic Memory System which Includes Apparatus for Performing Refresh Operations in Parallel with Normal Memory Operations".

Section 204

FIG. 4a illustrates in greater detail, the timing circuits of section 204. The circuits receive input timing pulse signals TTAP01010 and TTAP02010 from delay line timing generator circuits, not shown, conventional in design. The timing generator circuits generate a series of timing pulses via a pair of series connected 200 nanosecond delay lines in response to the signal MYACKR010 being switched to a binary ONE. These pulses in conjunction with the circuits of block 204 establish the timing for the remaining sections during a memory cycle of operation.

Additionally, the circuits of block 204 receive a boundary signal MYBNDY010, address signals LSAD22200 and LSAD22210 from section 207. Also, section 212 applies an initialize signal INITMM100 to section 204. The signal MYBNDY010 is applied to a NAND gate 204-5 which forces signal RASINH010 to a binary ZERO. The series connected AND gate 204-7 logically combines initialize signal INITMM100, refresh command signal REFCOM100 generated by circuits within section 204, not shown, to produce signal RASINH000. A NAND gate 204-8 combines signals RASINH000 and address signal LSAD22210 to produce an even row strobe inhibit signal ERASIH000.

The signal is applied to an AND gate 204-10 for combining with a timing signal MRASTT010 derived from signal TTAP01010 via an AND gate 204-1. The result output signal MRASTE010 is applied to the RAS timing input of the even stack units 210-20.

A NAND gate 204-14 combines signals RASINH000 and LSAD222000 to produce an odd row inhibit signal ORASIH000. This signal is combined in an AND gate 204-17 with timing signal MRASTT010 to generate row timing signal MRASTO010. This signal is applied to the RAS timing input of the odd stack units 210-40.

As seen from FIG. 4a, an AND gate 204-11 applies a timing signal MDECT000 to the even data register 206-8 in the absence of a refresh command (i.e., signal REFCOM100=0). Similarly, an AND gate 204-15 applies a timing signal MDOCT000 to the odd data register 206-10. The delay network 204-19 which connects in series with AND gates 204-3, 204-18 and 204-20 generate timing signal MCASTS010. The signal MCASTS010 is applied to the CAS timing input of the even and odd stack units 210-20 and 210-40.

Additionally, section 204 includes the logic and storage circuits of block 204-25. These circuits generate the signals which control the operation of one of the multiplexer circuits, more specifically, circuit 206-16 as explained herein. As shown, the circuits include a D type flip-flop 204-26 and an exclusive OR gate 204-28 and a pair of AND gates 204-29 and 204-30, connected as shown.

The flip-flop 204-26 is held in a binary ONE state except in the case of a double fetch operation when signal MDFETCH000 is a binary ZERO. This enables flip-flop 204-26 to reset to a binary ZERO when signal MYDCNN-000 switches from a binary ZERO to a binary ONE. The switching of the state of signal MUXCON0100 causes a change in the state of signal MUXDAT000. For example, when the least significant bit 22 is a binary ZERO, gate 204-28 switches signal MUXDAT000 to a binary ONE when signal MUXCON0100 is a binary ONE. When signal MUXCON0100 switches to a binary ZERO, gate 204-28 switches signal MUXDAT000 to a binary ZERO. However, when signal MDFETCH000 is a binary ONE indicating that the subsystem is operating in a double wide word mode, then signal MUXDAT000 switches state as a function of the complement of the least significant bits LSAD22 (i.e., signal LSAD22000).

The signal MUXDAT000 is applied to the select input terminal of the multiplexer circuit 206-16.

Section 207

FIG. 4b illustrates the different sections of address section 207. As shown, section 207 includes an input address section 207-1, an address decode section 207-2 and an address register section 207-4. The input address section 207-1 includes a set of manually selectable switches of block 207-10 which receive bus address signals BSAD04110 and BSAD06110. These switches select the high order bus address bit which selects the upper/lower 256K of memory when the system includes the full complement of 128K memory modules (i.e., modules A-D). When the memory modules are constructed using 64K chips, the top switch is placed in the closed position. This selects address bit 4 (signal BSAD04110) as the high order bus address bit. For 16K chips, the other switch is placed in the closed position which selects address bit 6.

Since it is assumed that the memory modules use 64K chips, the top switch is closed while the other switch is opened. The resulting high order bit signal BSADX6010 in addition to its complement along with the least significant bus address bits 22 and 21 are stored in a register 207-12. An inverter circuit 207-14 generates complement signal BSADX6000. The four signals are loaded into register 207-12 when address strobe signal ADDSTR000 is forced to a binary ZERO. This occurs when the memory is busy (i.e., accepts a bus cycle/a memory request).

The outputs of register 207-12 are applied as inputs to the section 207-2 in addition to sections 204 and 206. The input address section 207-1 includes boundary detection circuits of block 207-15. The circuits include a NAND gate 207-16 which connects to the D input terminal of a D type flip-flop 207-18 via an AND gate 207-17. The flip-flop 207-18 latches up the output signal BOUNDY010 generated by gate 207-16 in response to each double fetch/double wide memory request when signals MODESIGNAL and MEMBUSY010 are binary ONES. The NAND gate 207-16 receives the memory request address bits 22-17 from bus 10 and forces output detected boundary signal DBSA64000 to a binary ZERO when all of the address bits 22-17 are binary ONES. This, in turn, causes flip-flop 207-18 to switch from a binary ONE to a binary ZERO when MEMBUZ010 switches from a ZERO to ONE state forcing signal MYBNY010 to a binary ZERO. In the other cases, signal DBSA64000 is a binary ONE and signal MYBNY010 is set to a binary ONE. This signal MYBNDY010 is applied as an input to timing section 204.

As shown, the least significant address bit signals LSAD22210 and LSAD21210 are applied to the input terminals of a binary decoder circuit 207-20. The least significant bit address signal LSAD22210 and its complement signal LSAD22200 generated by an inverter circuit 207-22 are applied to sections 204 and 206. The high order bit signal LSADX6210 is applied to the enable/gate input terminal of decoder circuit 207-20. The complement signal LSADX6200 is applied to the enable/gate input of another decoder circuit, not shown, together with address signals LSAD22210 and LSAD21210. This circuitry has been omitted since it is assumed that the controller being described includes two memory modules. This means that high order address signal LSADX6210 is always a binary ZERO. Therefore, decoder circuit 207-20 is always enabled for operation.

Each of the four decode outputs DECOD0000 through DECOD3000 connects to a different pair of the NAND gates 207-24 through 207-30. It will be noted that the zero decode signal DECOD0000 connects to the inputs of NAND gates 207-24 and 207-26 which generate the 0 and 1 row address strobe signals. Similarly, the 1 decode signal DECOD1000 connects to the inputs of NAND gates 207-26 and 207-28 which generate the 1 and 2 row address strobe signals. The next sequential decode signal DECOD2000 connects to the two NAND gates which generate the next pair of sequential row address strobe signals. Lastly, the last decode signal DECOD3000 connects to NAND gates 207-30 and 207-24 which generate the 3 and 0 row address strobe signals.

As shown, the even row address strobe signals DRAST0010 and DRAST2010 are applied to the RAM chips of the even stack units 210-20. The odd row address strobe signals DRAST1010 and DRAST3010 are applied to the RAM chips of the odd stack units 210-40.

The address register section 207-4 of section 207 is included for the sake of completeness. The apparatus of this section forms a part of the subject matter of copending patent application "Sequential Word Aligned Addressing Apparatus" previously referenced. Therefore, this section will only be discussed to the extent necessary for a complete understanding of the present invention.

FIG. 4b shows that the bus address signals BSAD05210 through BSAD20210 are applied via the bus receiver circuits of block 214 of FIG. 3 as inputs to different stages of a row address register 207-40 and a column address register 207-42. The enabling gate input terminals of both registers are connected to receive a memory busy signal MEMBUZ010 from section 204. The OC input terminal of row address register 207-20 is connected to receive a timing signal MRASCT000 generated by AND gate 207-44, inverter circuit 207-46 and NAND gate 207-47 in response to signals INITMM000, REFCOM000 and MCASTT010. The OC input terminal of column address register 207-42 is connected to receive a timing signal MCASCT000 generated by NAND gate 207-44 and NAND gate 207-50 in response to signals INITMM000, REFCOM000 and MCASTT010.

Each of the address registers 207-40 and 207-42 are constructed from D type transparent latch circuits such as those designated as SN74S373 manufactured by Texas Instruments Incorporated. The register circuits are transparent meaning that while the G input terminal is a binary ONE, the signals at the Q output terminals follow the signals applied to the D input terminals. As seen from FIG. 4d, the different address output terminals of the registers of each set are connected in common in a wired OR arrangement for enabling the multiplexing of these address signals. Such multiplexing is accomplished by controlling the state of the signals applied to the output control (OC) input terminals of the registers 207-40 and 207-42.

More specifically, the output control (OC) terminals enable so-called tri-state operation which are controlled by the circuits 207-44 through 207-50. When each of the signals MRASCT000 and MCASCT000 is in a binary ONE state, this inhibits any address signal from being applied at the Q output terminals of that register. As mentioned, this operation is independent of the latching action of the register flip-flops. Additionally, section 207-4 includes a 4-bit binary full adder circuit 207-54, conventional in design. The adder circuit 207-54 is connected to increment by one, the low order address bits 20 through 17. In greater detail, the input terminal A1–A8 receive signals MADD00110 through MADD03110. Binary ZERO signals are applied to input terminals B1–B8. An AND gate 207-56 generates a carry in signal MADDUC010 as a function of the states of the least significant address signals LSAD22210 and LSAD21210, signal INTREF000 and timing signal DLY060010.

Figure 4C:
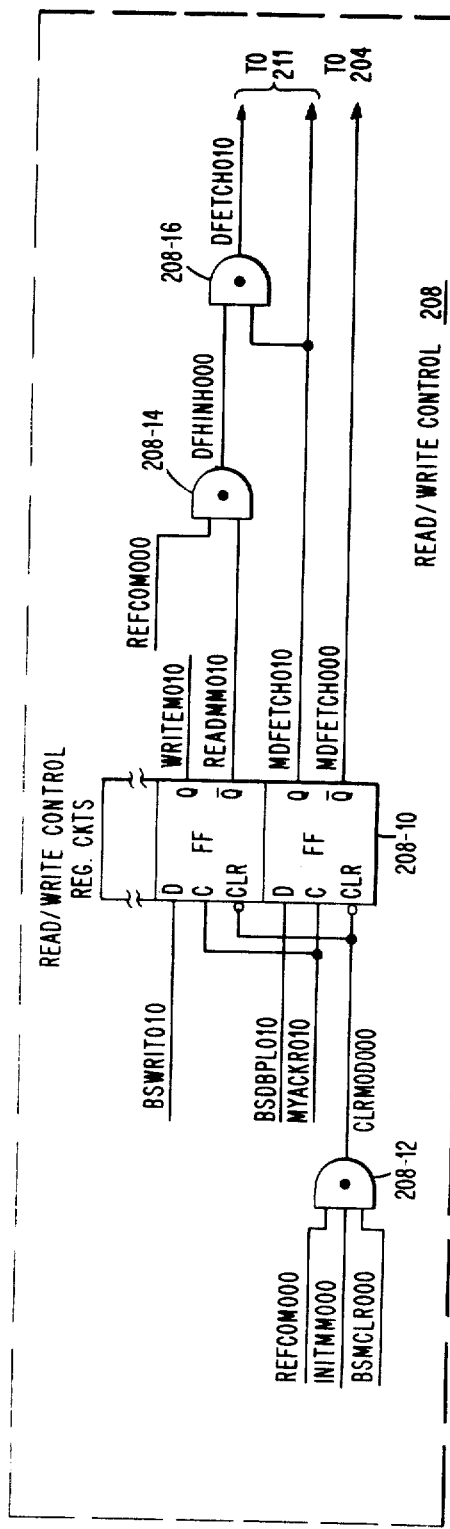
Figure 4D:
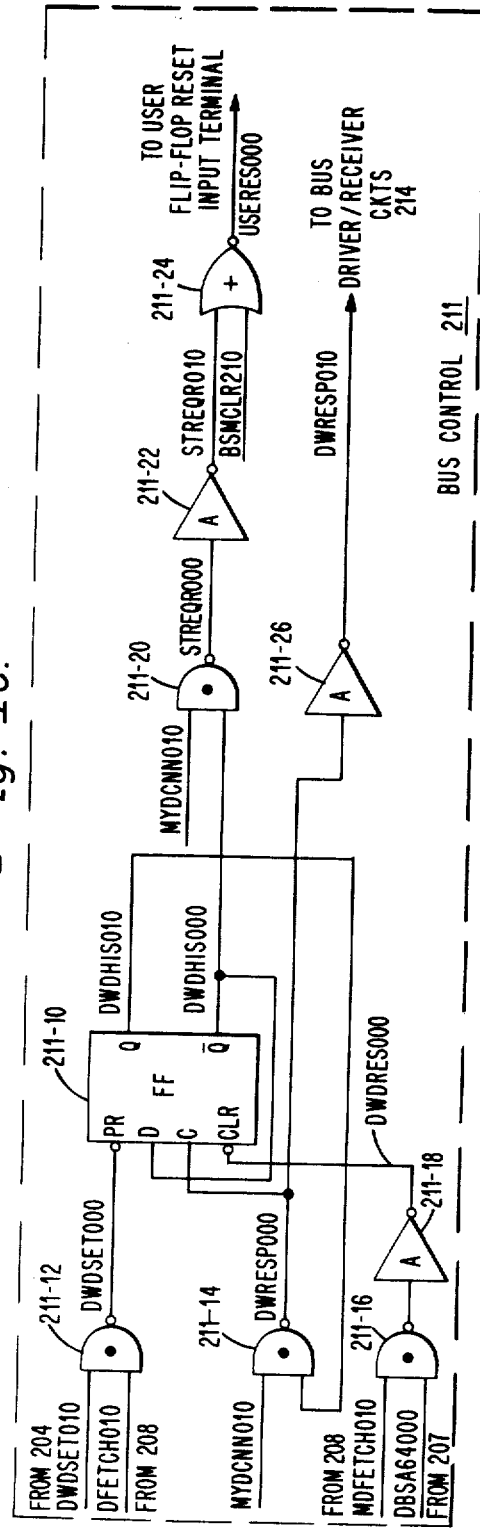
Figure 4E:
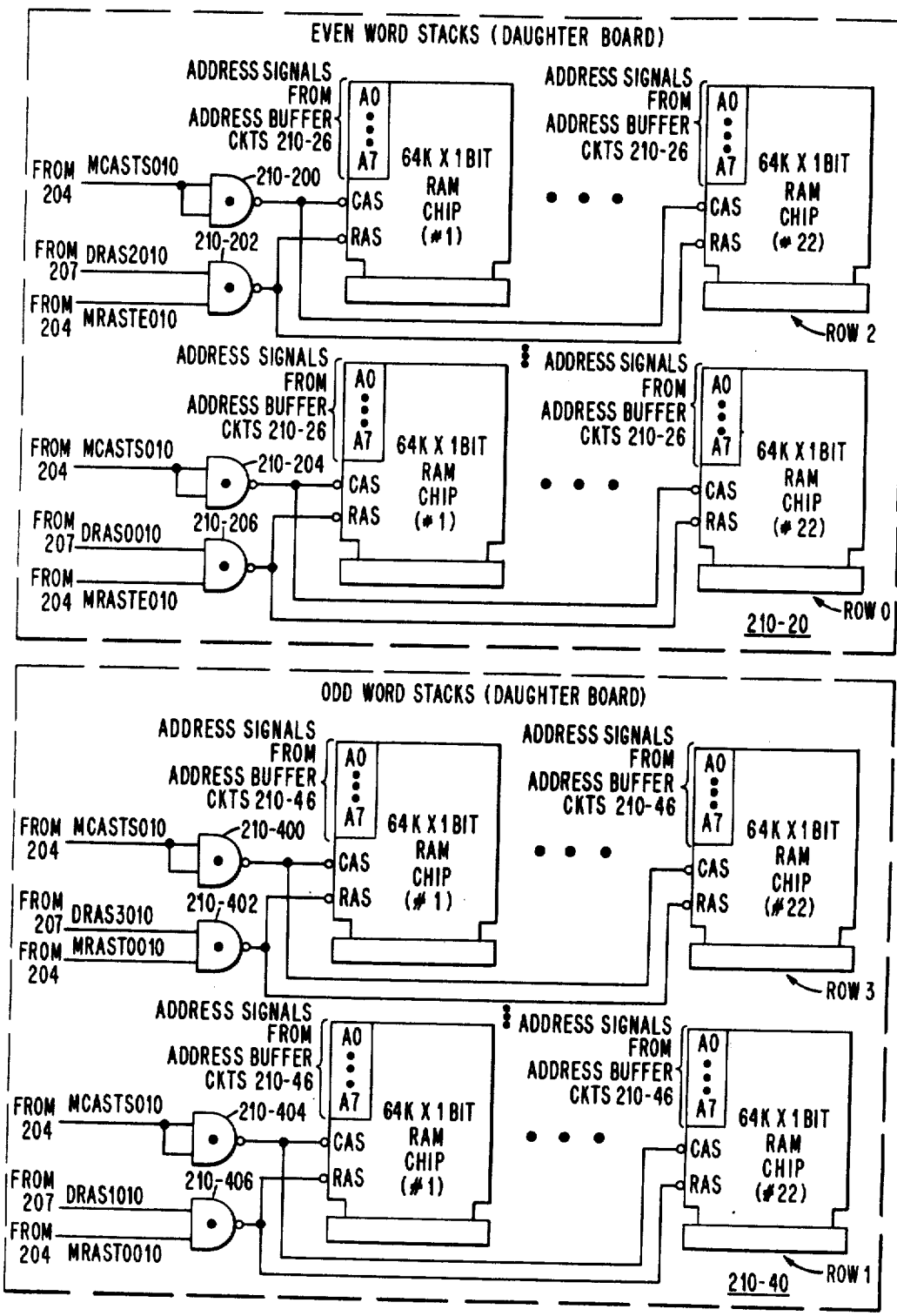

The incremented output signals MADD00111 through MADD0311 appearing at adder sum terminals S1–S8 are applied via address buffer circuits 210-26 to the even stack RAM chips of FIG. 4e. The same is true of signals MADD0410 through MADD07010. The odd stack RAM chips of FIG. 4e are connected to receive the address signals MADD0010 through MADD07010 via address buffer circuits 210-46.

Read/Write Control Section 208

A portion of the circuits of section 208 is shown in greater detail in FIG. 4c. As mentioned, the section 208 includes a register 208-10 and output gate circuits 208-14 and 208-16. The register 208-10 is a two D type flip-flop register for storing signal BSWRIT10 which is representative of a read/write command and signal BSDBPL10 which is representative of a double word pull/fetch type command. These signals are latched when signal MYACKR010 from section 211 switches to a binary ONE. When any one of the signals REFCOM000, INITMM000 or BSMCLR000 switches to a binary ZERO, an AND gate 208-12 forces signal CLRMOD000 to a binary ONE which clears register 208-10 to a binary ZERO state.

The read mode signal READMM010 and double fetch signal MDFETCH010 are applied to different ones of the AND gates 208-14 and 208-16. The series connected gates 208-14 and 208-16 operate to generate the double word pull/fetch signal DFETCH010. The AND gate 208-14 forces signal DFHINH000 to a binary ONE during a read cycle (i.e., READMM010 = 1) in the absence of a refresh cycle (i.e., REFCOM000 = 1). This causes AND gate 208-16 to force signal DFETCH010 to a binary ONE indicative of a double word pull cycle of operation. The double fetch signals DFETCH010, MDFETCH010 and MDFETCH000 are applied as inputs to sections 204 and 211, as shown. Also, signal READMM010 is used to generate read command signals in a conventional manner which are applied to the units 210-20 and 210-40. For further details, reference "A Dynamic Memory System which Includes Apparatus for Performing Refresh Operations in Parallel with Normal Memory Operations" cited above.

Bus Control Section 211

A portion of the circuits of section 211 is shown in FIG. 4d. These circuits enable the pair of data words stored in even and odd data registers 206-8 and 206-10 to be transferred to bus 10 during successive bus cycles of operation.

Before describing these circuits, a brief explanation of the operation of the bus circuits of section 211 will be given. These circuits are described in detail in the previously referenced patent application of John L. Curley, et al. The section 211, as other units which connect to bus 10, include a user flip-flop (not shown) which connects to a request flip-flop (not shown). The circuits shown in FIG. 4d provide an output to user flip-flop, in addition to the bus line BSDBL via the circuits of block 214.

When a timing signal from the timing generator circuits of section 204 switches from a binary ZERO to a binary ONE, the user flip-flop is switched to a binary ONE when the memory accepts a request and is not performing a refresh cycle. The stored request signal is applied to the input of a request flip-flop, not shown. When this flip-flop is switched to a binary ONE, its output is applied to the bus tie breaking network in addition to the bus driver/receiver circuits of block 214 whereupon it is inverted and is applied to bus line BSREQT. When line BSREQT is forced to a binary ZERO, it prevents any other stored requests of other units from setting their corresponding request flip-flops. Since the memory subsystem has the highest priority, this results in the switching of a grant flip-flop to a binary ONE. This results in signal MYDCNN010 being switched to a binary ONE. The signal MYDCNN010 is inverted by the driver/receiver circuits of block 214 and is applied to line BSDCNN. In the case of a double fetch operation, two successive signals MYDCNN010 are generated which enables the two data words read out from units 210-20 and 210-40 in response to the memory request to be transferred.

Now referring to FIG. 4d, it is seen that the circuits include a double fetch history flip-flop 211-10 and associated input circuits which include NAND gates 211-12, 211-14 and 211-16 in addition to an inverter circuit 211-18. The associated output circuits include a series connected NAND gate 211-20, inverter circuit 211-22 and NOR gate 211-24 generate signal USERES000 which is applied to the reset input terminal of the user flip-flop. They also include an inverter circuit 211-26 which generates signal DWRESP010 which is inverted by the driver/receiver circuits of block 210 and applied as signal BSDBPL000 of double fetch line BSDPBL.

Briefly discussing the operation of these circuits, it is seen that when signals DWDSET010 and DFETCH010 are forced to binary ONES, NAND gate 211-12 switches signal DWDSET000 to a binary ZERO. This switches double fetch history flip-flop 211-10 to a binary ONE state. This flip-flop remembers that the memory subsystem is responding to a double fetch request so that when the memory subsystem is granted access to the bus, it responds and forces the double fetch line BSDBPL to a binary ZERO during a first of two response cycles. This signals the requesting unit that the first word of the two word pair is being transferred.

When flip-flop 211-10 is set to a binary ONE, timing signal DWDHIS000, generated in response to signal MYACKR010 is forced to a binary ZERO. This inhibits NAND gate 211-20 from switching to a binary ZERO when the memory subsystem switches signal MYDCNN010 to a binary ONE state. Therefore, signal STREQR010 is forced to a binary ZERO by inverter 211-22 which causes NOR gate 211-24 to force reset signal USERES000 to a binary ONE. This inhibits the resetting of the user flip-flop which, in turn, inhibits the resetting of the memory request flip-flop. Therefore, the bus request line BSREQT remains a binary ZERO. Therefore, the memory subsystem continues to request a bus cycle.

When signals MYDCNN010 and DWDHIS010 are both binary ONES, NAND gate 211-14 forces signal DWRESP000 to a binary ZERO. This causes inverter 211-26 to switch signal DWRESP010 to a binary ONE. The signal DWRESP010 is inverted by the driver/inverter circuits of block 214 and forces the double fetch bus line BSDBPL to a binary ZERO.

Also, signal DWRESP000 is applied to the clock input (C) terminal of the flip-flop 211-10 and resets the flip-flop to a binary ZERO state in response to signal DWDHIS000 being forced to a binary ZERO. When signal DWDHIS000 is switched to a binary ZERO, this enables NAND gate 211-20 to switch signal STREQR000 to a binary ZERO in response to the next occurrence of signal MYDCNN010. This causes NOR gate 211-24 to force signal USERES000 to a binary ZERO which resets the user flip-flop to a binary ZERO. This, in turn, resets the request flip-flop which results in the bus request line BSREQT being switched to a binary ONE.

It will also be noted that when flip-flop 211-10 resets to a binary ZERO, signal DWDHIS010 causes NAND gate 211-14 to switch signal DWRESP000 to a binary ONE. This causes inverter 211-26 to switch signal DWRESP010 to a binary ZERO. The signal DWRESP010 is inverted and forces the double fetch bus line BSDBPL to a binary ONE.

Memory Units 210-10 and 210-40—FIG. 4e

As previously discussed, the even word and odd word stacks of blocks 210-20 and 210-40 are shown in greater detail in FIG. 4e. These stacks include two rows of 22 64K × 1-bit RAM chips as shown. The chips and associated gating circuits are mounted on a daughter board. Each daughter board includes 4, 2 input positive NAND gates (e.g. 210-200 through 210-206 and 210-400 through 210-406) which are connected to receive the row and column timing signals from section 204 and the row decode signals from section 207. Only those chip terminals pertinent to an understanding of the present invention are shown. The remaining terminals, not shown, are connected in a conventional manner. For further information, reference may be made to the copending patent application "Rotating Chip Selection Technique and Apparatus", invented by Chester M. Nibby, Jr. and William Panepinto, Jr., Ser. No. 921,292, filed on July 3, 1978, now U.S. Pat. No. 4,296,467 issued Oct. 20, 1981 and assigned to the same assignee as named herein.

DESCRIPTION OF OPERATION

Figure 5:
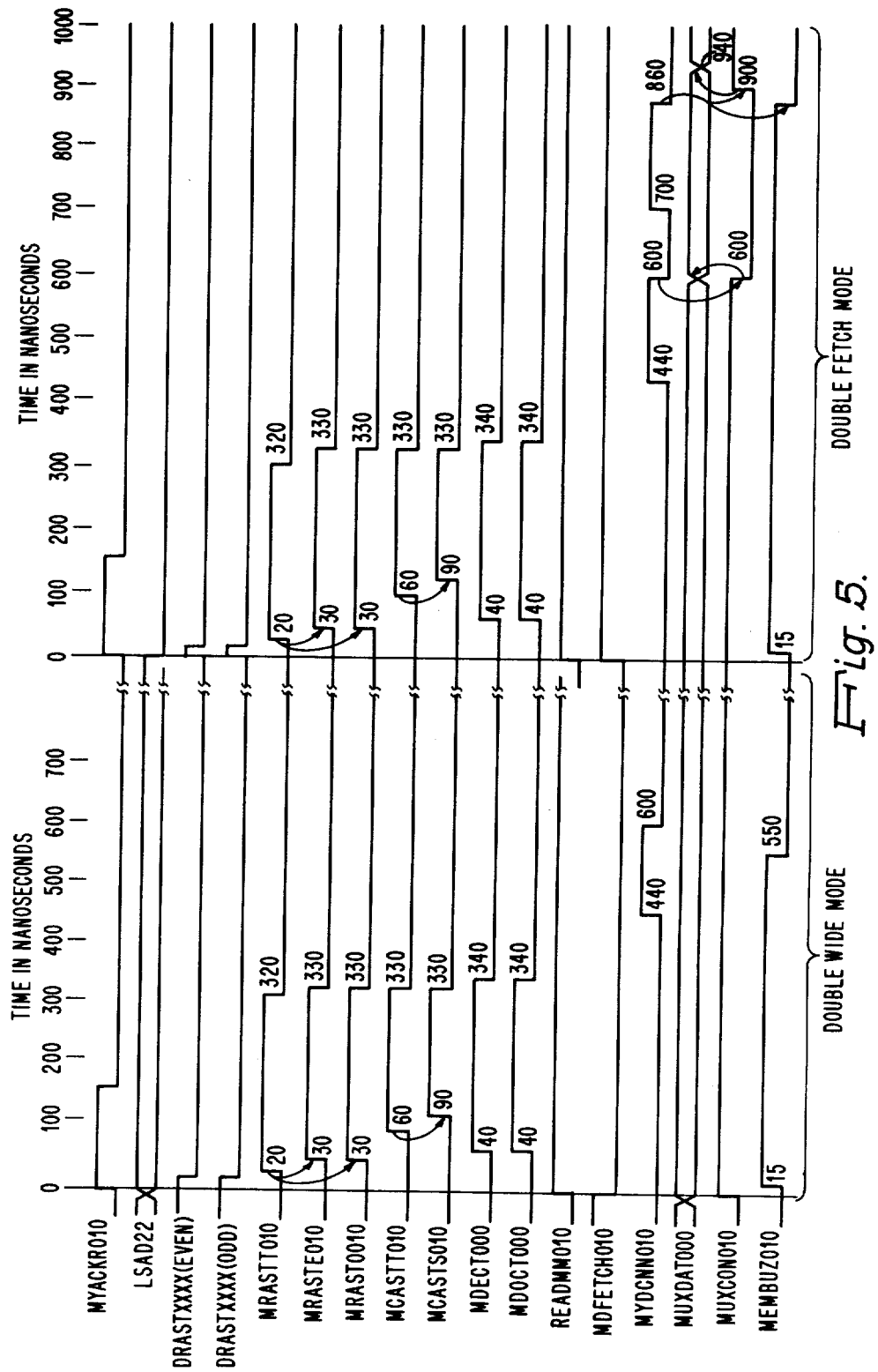
FIG. 5 is a timing diagram used in describing the operation of the present invention.
Figure 6A:
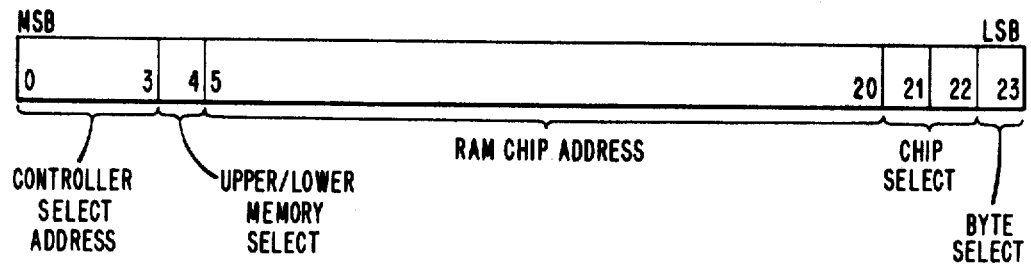
FIG. 6a illustrates the format of the address applied to the memory subsystem of FIG. 1.
Figure 6B:
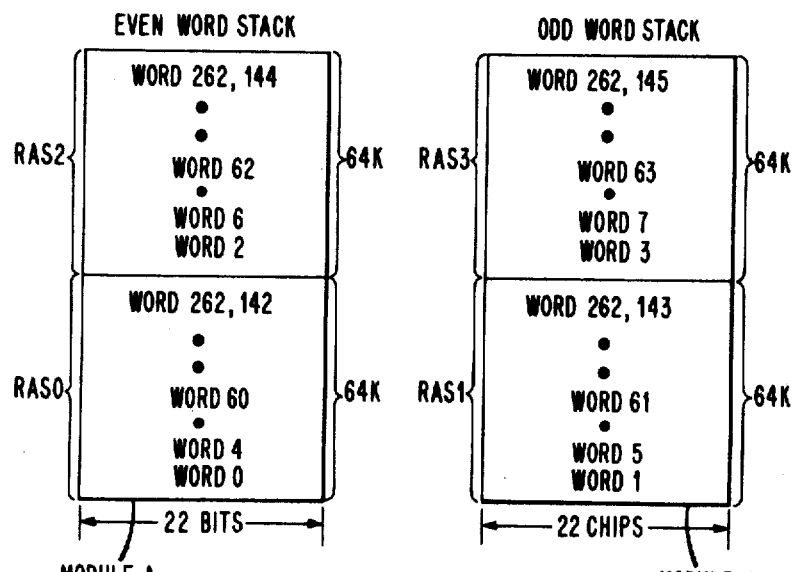
FIG. 6b illustrates the organization of memory modules of FIG. 1.

With reference to FIGS. 1–6b, the operation of the preferred embodiment of the present invention will now be described with particular reference to the timing diagram of FIG. 5. It will be assumed that each of the units 210-2 and 210-4 include a single 128K stack memory unit as shown in FIGS. 4e and 6b. It will be obvious that each of the units 210-2 and 210-4 can include any number of stack units with the provision that both of the units 210-2 and 210-4 include the same number of stack units.

Before discussing an example of operation with reference to FIG. 5, reference is first made to FIGS. 6a and 6b. FIG. 6a illustrates the format of the memory addresses applied to the memroy subsystem as part of each memory read or write request. The high order/most significant bit positions are coded to identify the memory module/controller to process the request. Address bit 4 is used to select which 256 K half (i.e., upper or lower half) of controller memory is being accessed. These address bits are processed by the circuits of memory subsystem 20 and are not provided to the RAM chips. Processing proceeds in a conventional manner such as disclosed in the above cited copending patent applications.

FIG. 6b illustrates the word memory organization of modules A and C of FIG. 1. As shown, modules A and C provide 256K words of memory. FIG. 6b will be referenced to explain the manner in which the apparatus of the present subsystem responds to boundary conditions.

Address bits 5-20 specify the address of the 22-bit storage location within the RAM chips being addressed. As explained in greater detail herein, these 16 address bits are multiplexed into 8 address inputs and applied via the address buffer circuits of blocks 210-26 and 210-46 to the address input terminals A0-A7 of the RAM chips of FIG. 4e.

The least significant address bits 21-22 are decoded to select which row of RAM chips are being addressed. As explained herein in greater detail, these bits are decoded and used to generate a pair of row address strobe (RAS) signals which latch the 8-bit row addresses into the desired row of RAM chips within each memory stack.

Memory Requests

As mentioned previously, CPU 40 can generate the different types of memory requests. For example, CPU 40 initiates a memory write operation by forcing the BSWRIT and BSMREF lines true and applying address and data to the BSAD and BSDT lines, respectively. In the system of FIG. 1, all memory write operations require a single bus cycle and involve the transfer of single or double words. Hence, CPU 40 places the BSDPL line in a false state signaling the memory that it is a single word request.

In the case of memory read operations, CPU 40 can specify when it wants a pair of words or two sequential words. Obviously, other types of word transfers are also possible. Reading a pair of words from memory requires two bus cycles. During the first cycle, the CPU 40 as the master requests the information by forcing the BSMREF line true and applying address and control information to the BSAD and BSDT lines, respectively. By forcing the BSWRIT line false, CPU 40 signals the slave unit that the memory operation requires a response. Also, CPU 40 signals its identity to the slave unit and tags the request as a single fetch request by applying its channel number and a function code value to the BSDT lines.

During the second bus cycle designated by the slave forcing line BSSHBC true, the fetched data words are returned to CPU 40 via the BSDT lines. The memory or slave also returns a function code to CPU 40 via the BSAD lines together with its address or channel number. This enables the CPU 40 to distinguish between memory requests since there can be different types of memory requests to different memory module units outstanding at the same time.

Reading two sequential words from memory requires three bus cycles when both words are in memory. When making a double fetch request, CPU 40 also forces the BSDBPL line true. During the second bus cycle, the memory, as master, forces the BSDBPL line true indicating to the CPU 40 that another word is to follow. During the third bus cycle, the memory delivers the second word.

FIG. 5 illustrates diagrammatically the relationships between the different timing and control signals generated by the memory subsystem 20 during double wide and double fetch memory operations. First, it is assumed that CPU 40 generates a read command request in which a pair of words are to be transferred in one cycle. This results in the switching of signal MYACKR010 to a binary ONE. As seen from FIG. 5, all of the signals are reference to signal MYACKR010 which starts a memory cycle of operation. The signal MYACKR010 causes the circuits of block 204 to force the memory busy signal MEMBUZ010 to a binary ONE indicating that the memory subsystem has begun a memory cycle of operation (i.e., memory is busy).

Referring to FIG. 4c, it is seen that signal MYACKR010 clocks the states of the bus write BSWRIT and double word fetch BSDBPL lines into register 208-10. Since this request specifies a double wide mode of operation, signals BSWRIT010 and BSDBPL010 are binary ZEROS. Accordingly, signals BSWRIT010 and BSDBPL010, respectively, force signals READMM010 and MDFETCH010 to a binary ONE and binary ZERO, respectively, as shown in FIG. 5.

Since there is no refresh command (i.e., signal REFCOM000 is a binary ONE), AND gate 208-14 forces signal DFHINH000 to a binary ONE. However, since signal MDFETCH010 is a binary ZERO, AND gate 208-16 forces signal DFETCHO010 to a binary ZERO. This inhibits the double word history flip-flop 211-10 of FIG. 4d from being switched to a binary ONE in response to signal DWDSET010.

In response to the memory busy signal MEMBUZ010, the bus address signals BSAD05210 through BSAD20210 are loaded into row address register 207-40 and column address register 207-42. Also, signal MEMBUZ010 switches signal ADDSTR000 of FIG. 4b to a binary ZERO. This loads the least significant address bit signals BSAD22110 and BSAD21110 in addition to signal BSADX610 into register 207-12.

As seen from FIG. 4b, the stored address signals LSAD22210 and LSAD21210 are decoded by decoder circuit 207-20 which is enabled for operation by signal LSADX6210. The decoder circuit 207-20 forces one of its decode signals to a binary ZERO. This signal conditions one of the pairs of NAND gates to force even and odd DRAST signals to binary ONES as shown in FIG. 5. As seen from FIG. 4e, the even RAS signal is applied to the input of the even word stack 210-20. The odd RAS signal is applied to the input of the odd word stack 210-40. When the timing signals MRASTE010 and MRAST0010 are generated, the row address signals applied via the address buffer circuits to the terminals A0-A7 of both rows of RAM chips are stored within stacks 210-20 and 210-40.

In greater detail, the timing circuits of FIG. 4a in response to signal MYACKR010 begin a cycle of operation during which timing signals TTAP01010 and TTAP02010 are generated. These signals cause gates 204-1, 204-3, 204-10 and 204-20 to generate signals MRASTT010, MCASTT010, MRASTE010 and MRAST0010, respectively, at the times shown in FIG. 5. As mentioned, the row timing signals MRASTE010 and MRAST0010 together with corresponding ones of the row decode signals generate even and odd row address strobe signals which are applied to the RAS terminals of both rows of RAM chips. At that time, signal MCASTT010 is a binary ZERO. From FIG. 4b, it is seen that the output signal MRASCT000 from NAND gate 207-47 is a binary ZERO at this time (i.e., when signal MCASTT010 is a binary ZERO). This conditions row address register 207-40 to apply the bus address signals at its inputs to its output terminals. Accordingly, both rows of RAM chips latch or store the 8-bit row address signals applied to the A0-A7 terminals.

As seen from FIG. 4a, timing signal MCASTT010 causes delay network 204-19, gates 204-18 and 204-20 to generate signal MCASTS010 at the time shown in FIG. 5. The signal MCASTS010 is applied via NAND gates 210-200, 210-204, 210-400 and 210-404. This results in a column address strobe signal being applied to the CAS terminals of the rows of RAM chips which latch or strobe the 8-bit column address signals applied to the A0-A7 terminals.

As seen from FIG. 4b, the above address corresponds to the bus address contents of column address register 207-42. That is, when signal MCASTT010 switches to a binary ONE, signals MRASCT000 and MCASCT000 switch to a binary ONE and binary ZERO, respectively. The result is that the bus address signals BSAD05210 and BSAD07210 through BSAD13210 are applied to the output terminals of register 207-42. At the same time, register 207-40 is inhibited from applying bus address signals to its output terminals.

The memory address bits BSAD05-20 cause the contents of the storage locations storing the pair of words specified to be accessed. This results in the even and odd word being loaded into the even data and odd data registers 206-8 and 206-10, respectively, in response to signals MDECT000 and MDOCT000. These signals are generated at the time shown in FIG. 5.

In accordance with the present invention, since signals MDFETCH000 and MDFETCH010 are a binary ONE and binary ZERO, respectively, the control circuits of block 204-25 of FIG. 4a generate signal MUXDAT000 as a function of the state of least significant bit LSAD22. That is, the output of AND gate 204-29 of FIG. 4a is a binary ONE. Also, flip-flop 204-26 is inhibited by signal MDFETCH000 from being switched from a binary ONE to a binary ZERO. Hence, signal MUXCON010 remains a binary ONE as shown in FIG. 5.

The even and odd words are applied to the multiplexer circuits 206-16 and 206-18 which, in response to signals MUXDAT000 and LSAD22210, apply the even and odd words to the sets of lines MUXD00-15 and MUXD16-31. When signal MUXDAT000 is a binary ZERO (i.e., signal LSAD22210 is a binary ZERO), the even word is transferred to lines MUXD00-15 via multiplexer circuit 206-16. At the same time, signal LSAD22200 causes the multiplexer circuit 206-18 to transfer the odd word to lines MUXD16-31. Of course, when the states of signals MUXDAT000 and LSAD22200 are reversed, the odd word is transferred to lines MUXD00-15 while the even word is transferred to lines MUXD16-31. Following the double word transfer during the occurrence of signal MYDCNN010, the circuits of section 204 switch the memory busy signal MEMBUZ010 to a binary ZERO. This completes the memory cycle of operation. Thereafter, signal MYDCNN010 switches to a binary ZERO.

It will be assumed that central processing unit 40 generates another memory request. This time the request specifies a double fetch cycle of operation. As seen from FIG. 5, signal MYACKR010 starts another memory cycle of operation.

Referring to FIG. 4c, it is seen that signal MYACKR010 clocks the states of the bus write BSWRIT and double word fetch BSDBPL lines into register 208-10. Since this is a double word fetch read request, signal BSWRIT010 is a binary ZERO while signal BSDBPL010 is a binary ONE. Accordingly, signals BSWRIT010 and BSDBPL010, respectively, force signals READMM010 and MDFETCH010 to binary ONES as shown in FIG. 5.

Since there is no refresh command (i.e., signal REFCOM000 is a binary ONE), AND gate 208-14 forces signal DFHINH000 to a binary ONE. This causes AND gate 208-16 to force signal DFETCH010 to a binary ONE. As previously described, in response to the memory busy signal MEMBUZ010, the bus address signals BSAD05210 through BSAD20210 are loaded into row address register 207-40 and column address register 207-42. Also, signal MEMBUZ010 switches signal ADDSTR000 of FIG. 4b to a binary ZERO. This loads the least significant address bit signals BSAD22110 and BSAD21110, in addition to signal BSADX610 into register 207-12.

As seen from FIG. 4b, the stored address signals LSAD22210 and LSAD21210 are decoded by decoder circuit 207-20 which is enabled for operation by signal LSADX6210. The decoder circuit 207-20 forces one of its decode signals to a binary ZERO. This signal conditions one of the pairs of NAND gates to force even and odd DRAST signals to binary ONES as shown in FIG. 5. Thus, the decode of the least significant address bits LSAD22-21 results in the simultaneous generation of the pair of row address strobe signals. As seen from FIG. 4e, the even RAS signal is applied to the input of the even word stack 210-20. The odd RAS signal is applied to the input of the odd word stack 210-40. When the timing signals MRASTE010 and MRAST0010 are generated, the row address signals applied via the address buffer circuits to the terminals A0–A7 of both rows of RAM chips are stored within stacks 210-20 and 210-40.

The memory address bits BSAD05-20 cause the contents of the storage locations storing the pair of words specified to be accessed. This results in the even word and odd word being loaded into even data and odd data registers 206-8 and 206-10, respectively, in response to signals MDECT000 and MDOCT000. These signals are generated at the time shown in FIG. 5.

In accordance with the teachings of the present invention, the even and odd words stored in registers 206-8 and 206-10 are transferred to bus 10 under the control of the circuits of sections 204 and 211. It will be assumed that the memory subsystem 20 has been granted access to bus 10.

Referring to FIG. 4d, it is seen that signals DWDSET010 and DFETCH010 switch the double fetch history flip-flop 211-12 to a binary ONE state. This causes signal DWRESP000 to force the double fetch line BSDBPL to a binary ZERO during the first of two response cycles. This signals the CPU 40 that the first word of the two word pair is being transferred.

In response to the switching of the grant flip-flop to a binary ONE indicating that subsystem 20 has been granted access, signal MYDCNN010 switches to a binary ONE. Signal MYDCNN010 is inverted by the driver/receiver circuits of block 214 and forces bus line BSDCNN to a binary ZERO. This signals the occurrence of a data cycle to CPU 40.

It will be assumed that the least significant bit LSAD22 is a binary ZERO. This means that the even word is the first word to be transferred to bus 10 during the first data cycle. Referring to FIG. 4a, it is seen that flip-flop 204-26 is in a binary ONE state. As shown in FIG. 5, exclusive OR circuit 204-28, in response to signals LSAD22200 and MUXCON010, maintains signal MUXDAT000 in a binary ONE state.

The binary ONE state of signal MUXDAT000 is applied to the multiplexer circuit 206-16. This enables the even word register contents to be applied as an output to the bus lines MUXD00-15 via circuits 206-12.

During the first response cycle, the leading edge of signal MYDCNN010 causes NAND gate 211-24 to force double word response signal DWRESP000 to a binary ZERO. The signal DWRESP000 is inverted and causes the driver/receiver circuits of block 214 to force line BSDBPL to a binary ZERO. When signal MYDCNN010 is applied to NAND gate 211-20, signal DWDHIS000 inhibits it from forcing signal STREQR000 to a binary ZERO preventing the resetting of the memory user flip-flop. Therefore, memory subsystem 20 continues to retain control of the bus 10.

Signal DWRESP000 also causes double fetch history flip-flop 211-10 to switch to a binary ZERO by clocking its binary ZERO output signal DWDHIS000 at its D input terminal. This forces signal DWDHIS000 to a binary ONE enabling NAND gate 211-20 to switch signal STREQR000 to a binary ZERO state when the second MYDCNN010 signal is applied.

Referring to FIG. 5, it is seen that the trailing edge of signal MYDCNN010 causes flip-flop 204-26 to switch to a binary ZERO state. More specifically, referring to FIG. 4a, it is seen that since signal MDFETCH000 is a binary ZERO, flip-flop 204-26 switches state in response to the positive going transition of complement signal MYDCNN000. This, in turn, forces signal MUXCON010 to a binary ZERO state.

The signal MUXCON010 conditions exclusive OR circuit 206-28 to switch the state of signal MUXDAT000 as shown in FIG. 5. That is, now signal MUXDAT000 is a binary ZERO. This enables the multiplexer circuit 206-16 to apply the odd word register contents as an output to bus lines MUXD00-15 via circuits 206-12. In both cases, it may be assumed that any signals appearing on bus lines MUXD16-31 are ignored by the central processing unit 40.

Since the user flip-flop was not reset during the first cycle, the memory subsystem 20 generates another MYDCNN010 signal as shown in FIG. 5. Since the double fetch history flip-flop 211-10 was reset at the end of the first response cycle, signal MYDCNN010 causes NAND gate 211-20 to force signal USERES000 to a binary ZERO which resets the user flip-flop and request flip-flop. Also, since flip-flop 211-10 has been reset, signal DWRESP000 is not forced to a binary ZERO which causes line BSDBPL to be in a history ONE state indicative that no other data words are to be transferred.

At the trailing edge of signal MYDCNN010, flip-flop 204-26 is switched to a binary ONE state as shown in FIG. 5. At this time, signals MUXDAT000 and MUXDAT010 are returned to their original states. Signal MYDCNN010 also causes MEMBUZ010 to switch to a binary ZERO which completes the memory double word fetch cycle of operation.

It will be appreciated that the same sequence of operations occur when least significant bit LSAD22 is a binary ONE. This causes the transfer of the odd word during the first response cycle (i.e., during first MYDCNN010) since signals MUXDAT000 and MUX-DAT010 have the opposite states. During the second response cycle, the even word is transferred to bus 10.

Accordingly, the memory subsystem of the present invention, in response to each double fetch command, operates to read out simultaneously a pair of words into the data registers 206-8 and 206-10 and transfer each of the words to bus 10 over successive bus cycles of operation.

Memory addressing proceeds as described for both modes of operation. For the least significant address bit values 00 through 10, the RAM chip address bits BSAD05-20 remain the same. However, each time the least significant address bits have the value "11", this creates a subboundary address condition. As explained in the copending referenced patent application, "Sequential Word Sligned Address Apparatus", this subboundary condition is extended by adder circuit 207-54 of FIG. 4b. The adder circuit 207-54 increments by one the row address signals applied to the RAM chips of the even memory unit 210-20 when the least significant address bits 21-22 have the value "11". The RAM chips of the odd memory unit 210-40 receive the unincremented row address.

For each double wide/double fetch operation, addressing proceeds in the above manner until the memory request address specifies word 63 or a multiple of 63 within the modules A and C of FIG. 6b. At this point, the range of the adder circuit 207-54 is exceeded. Since it is not possible to provide the correct row address, the boundary circuits of block 207-15 of FIG. 4b are operative to detect the boundary address condition and switch signal MYBNDY010 to a binary ZERO. That is, the all ONES value of bus address bits 22-17 causes NAND gate 207-16 to switch to a binary ZERO. This causes AND gate 207-18 to switch flip-flop 207-18 from a binary ONE to a binary ZERO state.

From FIG. 4a, it is seen that signal MYBNDY010 forces signal RASINH000 to a binary ONE. This conditions NAND gates 204-8 and 204-14 to generate row address strobe inhibit signals ERASIH000 and ORASIH000 as a function of the state of least significant address bit 22. Since bit 22 is a binary ONE, signal LSAD222000 is a binary ZERO which causes NAND gate 204-14 to switch signal ORASIH000 to a binary ONE. At the same time, NAND gate 204-8 switches signal ERASIH000 to a binary ZERO.

The above causes timing section 204 to generate only those timing signals required for accessing odd memory module 210-40. That is, AND gate 204-17 generates timing signal MRAST0010 which causes the row address to be latched into the rows of RAM chips of memory module C. Following the latching of the column address, the contents of storage location 63/multiple of word 63 defined by the row and column address is accessed and stored in odd data register 206-10 in response to timing signal MDOCT000 generated by AND gate 204-15. Thereafter, as a function of the particular mode of operation, the appropriate multiplexer circuit is conditioned to apply the odd word 63/multiple of module C to bus 10. That is, in the case of a double wide word operation, the odd word is always transferred to bus lines MUXD00-15, since the least significant address bit LSAD22 is a binary ONE. In the case of a double fetch operation, the odd word is transferred to bus lines MUXD00-15.

In the case of the double fetch operation, it is seen from FIG. 4d that signal DBSA64000 when forced to a binary ZERO additionally resets double fetch history flip-flop 211-10 via NAND gate 211-16 and inverter circuit 211-18 by forcing signal DWDRES000 to a binary ZERO. Resetting occurs after flip-flop 211-10 has been set to a binary ONE by signal DWDSET000 and before the first response cycle of the memory subsystem. Therefore, NAND gate 211-14 does not force the double fetch response signal DWRESP000 to a binary ZERO. Accordingly, memory subsystem 20 does not force the double fetch line BSDBPL to a binary ZERO during the transfer of the odd word indicating to the requesting unit that a second word is not being transferred.

From the above, it is seen how the arrangement of the present invention is able to provide multimode system operation in response to different types of memory requests. The arrangement requires a minimum of circuit complexity and operates without any adverse effect on memory system performance.

It will be appreciated by those skilled in the art that many changes may be made to the illustrated embodiment. For example, while a single control line BSDBPL was illustrated as establishing two modes of operation for the memory subsystem, it will be appreciated that separate lines and/or various control sequences/dialogs may also be utilized. This is particularly true where the memory subsystem processes single word memory requests. Here, the control line BSDBPL and another line is used to enable the boundary logic circuits of block 207-15.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A memory subsystem for use in a system including a processing unit coupled to a multiword bus in common with said subsystem for transfer of information therebetween during bus transfer cycles of operation, said processing unit being operative to generate at least first and second types of memory requests on said bus to said subsystem, each of said requests including a multibit address, said memory subsystem comprising:

a plurality of independently addressable memory module units, each including a plurality of rows of random access memory chips;

address register means for storing a number of least significant address bits of each memory request address;

sequential decode and addressing means coupled to said address register means, to said bus and to said memory module units, said addressing means being operative to generate simultaneously a plurality of sequential row address select signals and corresponding sequential addresses in response to said number of least significant address bits of each memory request for enabling simultaneous read out of a plurality of sequential words from storage locations specified by said sequential addresses in the rows of said chips specified by said plurality of address select signals;

command control means coupled to said bus, said control means including means for storing signals indicative of the type of memory request received from said processing unit;

a plurality of data register means, each coupled to a different one of said memory module units for receiving a different one of said plurality of data words simultaneously read out in response to each memory request;

a plurality of multiplexer circuit means, each coupled to said plurality of data register means and to different word sections of said multiword bus, one of said multiplexer circuit means being connected to said address register means; and mode control means coupled to another one of said plurality of multiplexer circuit means, to said address register means and to said command control means, said mode control means being operative in response to one of said signals from said command control means indicative of said first type of memory request to enable said another multiplexer circuit means to apply one of said plurality of data words to one of said different word sections simultaneously with the application of another one of said plurality of data words by said one multiplexer circuit means to another one of said different word sections for transfer of said plurality of data words to said processing unit during a single bus cycle of operation and said mode control means being operative in response to another one of said signals indicative of said second type of memory request to enable said another one of said plurality of multiplexer circuit means to apply in succession each data word of said plurality of data words to said one of said different word sections of said multiword bus for transfer to said processing unit over successive bus cycles of operation.

2. The memory subsystem of claim 1 wherein said subsystem further includes:

timing means for generating a predetermined sequence of timing signals in response to each memory request, said timing means being coupled to said plurality of memory module units and to said plurality of data register means, said plurality of said register means being conditioned by certain ones of said sequence of timing signals to store simultaneously said plurality of data words accessed from the storage locations designated by said sequential addresses in said rows of chips specified by said plurality of address select signals.

3. The memory subsystem of claim 2 wherein said command control means includes:

bistable means coupled to said bus, said bistable means being connected to store signals indicating when said memory request specifies said first and second types of memory requests, said bistable means being coupled to said mode control means, said mode control means including gating means connected to said another one of said plurality of multiplexer circuit means and to said address register means, said gating means being operative in response to said first type of request to generate an output signal as a function of the state of the least significant address bit for enabling said another multiplexer circuit means to apply said one data word to said one of said word sections simultaneously with said application of another data word and said gating means in response to a signal indicative of said second type of request to generate a series of control signals for conditioning said another multiplexer circuit means to transfer each of said data words in succession to said one word section in the order specified by the coding of the least significant address bit.

4. The subsystem of claim 3 wherein each memory request coded to specify said first type of memory request causes the simultaneous transfer of said plurality of words and said second type of memory request causes the sequential transfer of a plurality of words fetched from a corresponding number of word locations in said plurality of memory module units.

5. The subsystem of claim 3 wherein each of said plurality of multiplexer circuit means includes a multiplexer circuit having a plurality of sets of input terminals, a control input terminal and a plurality of output terminals, each set of input terminals of each multiplexer circuit being connected to a different one of said plurality of data register means, said control input terminal of one multiplexer circuit being connected to said address register means for receiving a signal corresponding to said least significant address bit and said control terminal of another multiplexer circuit being connected to said gating means and said plurality of output terminals of each multiplexer circuit being connected to said different word sections of said bus, said multiplexer circuits being operative in response to signals applied to said control input terminals to transfer one or more said data words from said data register means to said bus.

6. The subsystem of claim 5 wherein said mode control means further includes mode bistable means having a plurality of inputs and an output, one of said inputs being coupled to said bistable means and another input to said bus, and said output being connected to said gating means, said mode bistable means when in a first state during a first mode of operation conditioning said gating means to switch to a first or second state as a function of said least significant bit for conditioning said another multiplexer circuit to transfer said one data word during said single bus cycle and said mode bistable means when in said first state during a second mode of operation, conditioning said gating means to switch to said state as a function of said least significant address bit so as to generate a first one of said series of control signals for conditioning said another multiplexer circuit to apply a first data word to said bus during a first one of said bus cycles and said bistable means switching from said first state to a second state in response to a first signal from said bus signalling the completion of said first bus cycle, said gating means being conditioned by said bistable means when in said second state to switch to the complement of said first or second state so as to generate a second one of said series of control signals for conditioning said another multiplexer circuit to apply a second data word to said bus during a second one of said bus cycles.

7. The subsystem of claim 6 wherein said gating means includes an exclusive OR gate for complementing the state of said least significant address bit as a function of the state of said mode bistable means.

8. The subsystem of claim 7 wherein said mode bistable means is operative when enabled by said bistable means in response to a second signal signalling the completion of said second bus cycle from said bus to switch from said second state to said first state so as to return said gating means to its initial state for processing the next memory request.

9. The subsystem of claim 2 wherein said subsystem further includes boundary circuit means coupled to receive predetermined address bits of said memory request and a mode signal from said bus indicative of said first or second type of memory request, said boundary circuit including means coupled to said timing means for generating an output boundary condition signal in response to each predetermined first or second type of memory request when said predetermined address bits specify a predetermined value.

10. The subsystem of claim 9 wherein said timing means includes a plurality of gating means coupled to receive signals representative of the least significant address bit and its complement from said address register means, said plurality of gating means logically combining said output boundary condition signal with said least significant address bit and said complement for generating a plurality of said other timing signals, said plurality of gating means being conditioned by said boundary condition signal to generate half of said certain ones of timing signals specified by the coding of said least significant address bit for read out of a first one of said plurality of data words from a storage location within a row of chips of one of said plurality of memory module units into a predetermined one of said plurality of data register means.

11. The subsystem of claim 10 wherein said subsystem further includes bus control means coupled to said command control means, to said bus and to said timing means and to said boundary circuit means, said bus control means including:
bistable means having a plurality of input terminals and output terminals; a plurality of input gating means coupled to said input terminals, a first one of said gating means being coupled to said timing means and a second one of said gating means being coupled to said boundary circuit means; and,
output circuit means coupled to said bus; and,
said command control means including:
bistable means coupled to said first one of said gating means and to said bus, said bistable means for storing signals indicating when said memory request specifies said first or second type of memory request; and,
said bistable means being conditioned by said signal indicative of said second type of request to switch to a first state for generating at said output circuit means a response signal for applying to said bus during the transfer of each data word indicating continued transfer of data words and said second one of said gating means being operative in response to said boundary condition signal generated during said second type of request to switch said bistable means from said first state to a second state for inhibiting the generation of said response signal for indicating that only a first word of said plurality of data words is being transferred.

12. A memory subsystem for use in a system including a processing unit coupled to a multiword bus in common with said subsystem for transfer of information therebetween during bus transfer cycles of operation, said processing unit being operative to generate at least first and second types of memory requests on said bus to said subsystem, each of said requests including a multibit address, said memory subsystem comprising:
a pair of independently addressable memory module units, each including a plurality of rows of random access memory chips;
an address register for storing a number of least significant address bits of each memory request address;
sequential decode and addressing means coupled to said address register means, to said bus and to said memory module units, said means being operative to generate simultaneously a pair of sequential row address select signals and corresponding sequential addresses in response to said number of least significant address bits of each memory request enabling simultaneous read out of a pair of sequential words from storage locations specified by said sequential addresses in the rows of said chips specified by said pair of address select signals;
read/write control means coupled to said bus, said control means including means for storing signals indicative of the type of memory request received from said processing unit;

a pair of data registers, each coupled to a different one of said memory module units for receiving a different one of said pair of data words simultaneously read out to said pair of registers in response to each read memory request;

a pair of multiplexer circuits, each coupled to said pair of data registers and to different sets of word lines of said multiword bus, one of said multiplexer circuits being connected to said address register; and, mode control means coupled to the other one of said pair of multiplexer circuits, to said address register and to said read/write control means, said mode control means being operative in response to a signal from said read/write control means indicative of said first type of memory request to enable said other multiplexer circuit to apply one of said pair of data words to one set of word lines simultaneously with the application of the other one of said pair by said one multiplexer circuit to another set of word lines for a double word transfer during a single bus cycle of operation and said mode control means being operative in response to said signal indicative of said second type of memory request to apply successively each data word of said pair of data words to said one set of word lines for transfer over successive bus cycles of operation.

13. The memory subsystem of claim 12 wherein said subsystem further includes:

timing means for generating a predetermined sequence of timing signals in response to each memory request, said timing means being coupled to said plurality of memory module units and to said plurality of data registers, said plurality of said registers being conditioned by certain ones of said sequence of timing signals to store simultaneously said pair of data words accessed from the storage locations designated by said sequential addresses in said rows of chips specified by said pair of address select signals.

14. The memory subsystem of claim 13 wherein said read/write control means includes:

bistable means coupled to said bus, said bistable means being connected to store signals indicating when said memory request specifies said first and second types of memory requests, said bistable means being coupled to said mode control means, said mode control means including gating means connected to said other one of said pair of multiplexer circuits and to said address register, said gating means being operative in response to said first type of request to generate an output signal as a function of the state of the least significant address bit for enabling said other multiplexer circuit to apply said one data word to said one set of said word lines simultaneously with said application of another data word and said gating means in response to a signal indicative of said second type of request to generate a series of control signals for conditioning said another multiplexer circuit to transfer in succession each of said data words to said one set of word lines in the order specified by the coding of the least significant address bit.

15. The subsystem of claim 14 wherein each memory request coded to specify said first type of memory request causes the simultaneous transfer of said pair of words and said second type of memory request causes the sequential transfer of a pair of words fetched from a corresponding number of word locations in said pair of memory module units.

16. The subsystem of claim 14 wherein each of said multiplexer circuits includes a pair of sets of input terminals, a control input terminal and a plurality of output terminals, each set of input terminals of each multiplexer circuit being connected to a different one of said pair of data registers, said control input terminal of said one multiplexer circuit being connected to said address register for receiving a signal corresponding to said least significant address bit and said control terminal of said other multiplexer circuit being connected to said gating means and said plurality of output terminals of each multiplexer circuit being connected to said different set of said word lines of said bus, said multiplexer circuits being operative in response to signals applied to said control input terminals to transfer one or more said data words from said data registers to said bus.

17. The subsystem of claim 14 wherein said mode control means further includes mode bistable means having a plurality of inputs and an output, one of said inputs being coupled to said bistable means and another input to said bus, and said output being connected to said gating means, said mode bistable means when in a first state during a first mode of operation conditioning said gating means to switch to a first or second state as a function of said least significant bit for conditioning said other multiplexer circuit to transfer said one data word during said single bus cycle and said mode bistable means when in said first state during a second mode of operation, conditioning said gating means to switch to said state as a function of said least significant address bit so as to generate a first one of said series of control signals for conditioning said other multiplexer circuit to apply a first data word to said bus during a first one of said bus cycles and said bistable means switching from said first state to a second state in response to a first signal from said bus signalling the completion of said first bus cycle, said gating means being conditioned by said bistable means when in said second state to switch to the complement of said first or second state so as to generate a second one of said series of control signals for conditioning said other multiplexer circuit to apply a second data word to said bus during a second one of said bus cycles.

18. The subsystem of claim 17 wherein said gating means includes an exclusive OR gate for complementing the state of said least significant address bit as a function of the state of said mode bistable means.

19. The subsystem of claim 18 wherein said mode bistable means is operative when enabled by said bistable means in response to a second signal signalling the completion of said second bus cycle from said bus to switch from said second state to said first state so as to return said gating means to its initial state for processing the next memory request.

20. The subsystem of claim 13 wherein said subsystem further includes boundary circuit means coupled to receive predetermined address bits of said memory request and a mode signal from said bus indicative of said first or second type of memory request, said boundary circuit including means coupled to said timing means for generating an output boundary condition signal in response to each predetermined first or second type of memory request when said predetermined address bits have a predetermined value.

21. The subsystem of claim 20 wherein said timing means includes a plurality of gating means coupled to receive signals representative of the least significant address bit and its complement from said address register, said plurality of gating means logically combining said output boundary condition signal with said least significant address bit and said complement for generating a plurality of said other timing signals, said plurality of gating means being conditioned by said boundary condition signal to generate half of said certain ones of timing signals specified by the coding of said least significant address bit for read out of a first one of said plurality of data words from a storage location within a row of chips of one of said pair of memory module units into a predetermined one of said pair of data registers.

22. A memory subsystem for use in a system including a processing unit coupled to a multiword bus in common with said subsystem for transfer of information therebetween during bus transfer cycles of operation, said processing unit being operative to generate memory requests on said bus, said requests including at least first and second types of memory read requests, each of said requests including a multibit address, said memory subsystem comprising:

at least a pair of independently addressable memory module units, each memory unit including a plurality of rows of random access memory chips for providing storage of data words, one module unit including the even numbered rows containing storage locations having even addresses and the other module unit including the odd numbered rows containing storage locations having odd addresses;

an address register for storing a number of least significant address bits of each memory request address;

sequential decode and addressing means coupled to said address register, to said bus and to said memory module units, said addressing means being operative to generate simultaneously a plurality of odd and even sequential row address select signals and corresponding sequential addresses from said multibit address in response to said number of least significant address bits of each memory request enabling simultaneous read out of a pair of sequential words from storage locations specified by said sequential addresses in the rows of said chips specified by said plurality of odd and even row address select signals;

read/write control means coupled to said bus, said control means including means for storing signals indicative of the type of memory request received from said processing unit;

a pair of data registers connected to receive the pair of data words read out from said memory module units in response to each read type of memory request during a single bus cycle;

a pair of multiplexer circuits, each coupled to said pair of data registers and to different word sections of said multiword bus, at least one of said multiplexer circuits being coupled to said address register; and mode control means coupled to at least another one of said pair of multiplexer circuits, to said address register and to said read/write control means, said mode control means being operative in response to said signals from said read/write control means indicative of said first and second types of memory requests to enable said another one of said pair of multiplexer circuits to apply a first data word and each data word of said pair of data words to one of said different word sections for transfer to said processing unit over a single bus cycle and successive bus cycles respectively.

23. The memory subsystem of claim 22 wherein said subsystem further includes:

timing means for generating a predetermined sequence of timing signals in response to each memory request, said timing means being coupled to said pair of memory module units and to said pair of data registers, said pair of said registers being conditioned by certain ones of said sequence of timing signals to store simultaneously said plurality of data words accessed from the storage locations designated by said sequential addresses in said rows of chips specified by said plurality of address select signals.

24. The memory subsystem of claim 23 wherein said read/write control means includes:

bistable means coupled to said bus, said bistable means being connected to store signals indicating when said memory request specifies said first and second types of memory requests, said bistable means being coupled to said mode control means, said mode control means including gating means, connected to said another one of said pair of multiplexer circuits and to said address register, said gating means being operative in response to said first type of request to generate an output signal as a function of the state of the least significant address bit for enabling said another multiplexer circuit to apply said one data word to said one of said word sections simultaneously with said application of another data word and said gating means in response to a signal indicative of said second type of request to generate a series of control signals for conditioning said another multiplexer circuit to transfer in succession each of said data words to said one word section in the order specified by the coding of the least significant address bit.

25. The subsystem of claim 24 wherein each memory request coded to specify said first type of memory request as a double wide operation which causes the simultaneous transfer of said pair of words and said second type of memory request specifies a double pull operation which causes the sequential transfer of a pair of words fetched from a corresponding number of word locations in said pair of memory module units.

26. The subsystem of claim 24 wherein each of said multiplexer circuits includes a plurality of sets of input terminals, a control input terminal and a plurality of output terminals, each set of input terminals of each multiplexer circuit means being connected to a different one of said pair of data register means, said control input terminal of said one multiplexer circuit being connected to said address register for receiving a signal corresponding to said least significant address bit and said control terminal of said another multiplexer circuit means being connected to said gating means and said plurality of output terminals of each multiplexer circuit being connected to said different one of said word sections of said bus, said multiplexer circuits being operative in response to signals applied to said control input terminals to transfer one or more said data words from said data registers to said bus.

27. The subsystem of claim 24 wherein said mode control means further includes mode bistable means having a plurality of inputs and an output, one of said inputs being coupled to said bistable means and another input to said bus, and said output being connected to said gating means, said mode bistable means when in a first state during a first mode of operation conditioning said gating means to switch to a first or second state as a function of said least significant bit for conditioning said another multiplexer circuit to transfer said one data word during said single bus cycle and said mode bistable means when in said first state during a second mode of operation, conditioning said gating means to switch to said state as a function of said least significant address bit so as to generate a first one of said series of control signals for conditioning another multiplexer circuit to apply a first data word to said bus during a first one of said bus cycles and said bistable means switching from said first state to a second state in response to a first signal from said bus signalling the completion of said first bus cycle, said gating means being conditioned by said bistable means when in said second state to switch to the complement of said first or second state so as to generate a second one of said series of control signals for conditioning said another multiplexer circuit to apply a second data word to said bus during a second one of said bus cycles.

28. The subsystem of claim 27 wherein said gating means includes an exclusive OR gate for complementing the state of said least significant address bit as a function of the state of said mode bistable means.

29. The subsystem of claim 28 wherein said mode bistable means is operative when enabled by said bistable means in response to a second signal signalling the completion of said second bus cycle from said bus to switch from said second state to said first state so as return said gating means to its initial state for processing the next memory request.

30. The subsystem of claim 23 wherein said subsystem further includes boundary circuit means coupled to receive predetermined address bits of said memory request and a signal from said bus indicative of said first or second type of memory operation, said boundary circuit including means coupled to said timing means for generating an output boundary condition signal in response to each predetermined first or second type of memory operation when said predetermined address bits have a predetermined value.

31. The subsystem of claim 30 wherein said timing means includes a plurality of gating means coupled to receive signals representative of the least significant address bit and its complement from said address register, said plurality of gating means logically combining said output boundary condition signal with said least significant address bit and said complement for generating a plurality of said other timing signals, said plurality of gating means being conditioned by said boundary condition signal to generate half of said certain ones of timing signals specified by the coding of said least significant address bit for read out of a first word of said pair of data words from a storage location within a row of chips of one of said pair of memory module units into a predetermined one of said pair of data registers.

* * * * *